(12) United States Patent
Gardner

(10) Patent No.: US 12,354,406 B2
(45) Date of Patent: Jul. 8, 2025

(54) METHODS AND APPARATUS FOR DETERMINING THE DATE OF A SCANNED PHOTO FROM FACE DATA AND USING SUCH DATE INFORMATION

(71) Applicant: Wrethink, Inc., Del Mar, CA (US)

(72) Inventor: James Gardner, Palm Springs, CA (US)

(73) Assignee: Wrethink, Inc., Del Mar, CA (US)

( * ) Notice: Subject to any disclaimer, the term of this patent is extended or adjusted under 35 U.S.C. 154(b) by 521 days.

(21) Appl. No.: 17/566,680

(22) Filed: Dec. 31, 2021

(65) Prior Publication Data

US 2022/0343684 A1 Oct. 27, 2022

Related U.S. Application Data

(60) Provisional application No. 63/179,051, filed on Apr. 23, 2021.

(51) Int. Cl.
*G06V 40/00* (2022.01)
*G06F 16/58* (2019.01)
*G06N 3/04* (2023.01)
*G06Q 10/1093* (2023.01)
*G06V 40/16* (2022.01)

(52) U.S. Cl.
CPC ........ *G06V 40/178* (2022.01); *G06F 16/5866* (2019.01); *G06N 3/04* (2013.01); *G06Q 10/1093* (2013.01); *G06V 40/172* (2022.01)

(58) Field of Classification Search
CPC .... G06V 40/178; G06V 40/172; G06V 20/30; G06F 16/5866; G06N 3/04; G06N 3/02; G06N 7/01; G06Q 10/1093
See application file for complete search history.

(56) References Cited

U.S. PATENT DOCUMENTS

| | | | |
|---|---|---|---|
| 7,319,779 B1* | 1/2008 | Mummareddy | G06V 40/172 382/226 |
| 2006/0245624 A1* | 11/2006 | Gallagher | G06V 40/172 382/118 |
| 2009/0310863 A1* | 12/2009 | Gallagher | G06V 40/16 382/182 |
| 2010/0329575 A1* | 12/2010 | Scalise | G06F 16/58 358/448 |

(Continued)

*Primary Examiner* — Van D Huynh
(74) *Attorney, Agent, or Firm* — Straub & Straub; Michael P. Straub; Stephen T. Straub

(57) ABSTRACT

Methods and apparatus for determining and/or using the image date, e.g., image capture date, of one or more scanned images based on image content is described. In various embodiments at least one object, e.g., face of a person, is identified in an image. The age of the object is determined, e.g., using age estimation techniques. The determined, e.g., estimated, age of the identified face is then compared to stored face age to image capture date information. Such information is obtained or derived from other images with known capture dates and including an image of the same object, e.g., face, as the image with the unknown date. Based on the estimated object age and stored information associating object age to image capture date, the image date, e.g., image capture date of the scanned image is determined. This information is then used to organize storage of the image with other images.

20 Claims, 27 Drawing Sheets

(56) References Cited

U.S. PATENT DOCUMENTS

| | | | | |
|---|---|---|---|---|
| 2011/0150302 | A1* | 6/2011 | Moriyama | G06F 16/583 |
| | | | | 382/118 |
| 2012/0002878 | A1* | 1/2012 | Kuriyama | G06V 40/16 |
| | | | | 348/E5.024 |
| 2012/0308087 | A1* | 12/2012 | Chao | G06V 40/16 |
| | | | | 382/115 |
| 2013/0266215 | A1* | 10/2013 | Brookhart | G06F 16/51 |
| | | | | 382/218 |
| 2014/0064577 | A1* | 3/2014 | Kato | G06V 40/172 |
| | | | | 382/118 |
| 2020/0410680 | A1* | 12/2020 | Matsumoto | G06V 20/30 |
| 2022/0129587 | A1* | 4/2022 | Jones | G06F 21/6272 |

* cited by examiner

| FIGURE 11A |
| FIGURE 11B |
| FIGURE 11C |

METHODS AND APPARATUS FOR DETERMINING THE DATE OF A SCANNED PHOTO FROM FACE DATA AND USING SUCH DATE INFORMATION

RELATED APPLICATIONS

The present application claims the benefit of U.S. Provisional Patent Application Ser. No. 63/179,051 which was filed on Apr. 23, 2021 and which is hereby expressly incorporated by reference in its entirety.

FIELD OF THE INVENTION

The invention relates to determining the date of an image and/or using image date information.

BACKGROUND

Images of a scene area including one or more individuals may be captured by a digital camera. In such cases data and/or location information, sometimes referred to as metadata, is often included by the camera which captures in the digital image with the data representing the actual image content. Thus, in the case of an image captured by a digital camera the date of original image capture is often known from the data included in the image file.

In the case of photographs, e.g., printed photos, which are scanned to convert them into digital form, the date of scanning does not provide information about the original data of capture and thus the image date is often unknown.

For storing and retrieving images it is often desirable to know and be able to search on the date of the image, e.g., original image capture date, as opposed to the date of scanning. This allows for images to be arranged and searched based on date order. This is particularly useful where one is interested in grouping images according to time, searching images based on time, and/or seeing changes in individuals or places over time.

In view of the above it should be appreciated that it would be desirable if there were methods and/or apparatus which could automatically determine the date of a scanned image based on the content of the scanned image and/or for using such date information.

SUMMARY OF THE INVENTION

Methods and apparatus for automatically determining the date, e.g., original image capture date, of an image based on image content are described.

In various embodiments images with known dates are processed to identify objects, e.g., faces of one or more persons, in the individual images. The objects could also be cars, animals, trees or other physical objects with which dates can be associated and which are likely to change over time due to growth, weathering or for other reasons. The object may be and sometimes is a person. In some embodiments the images with known dates are images that were captured by one or more digital cameras which incorporate image capture date into the image data, e.g., data representing a photograph captured by the camera.

An age is determined for one or more objects, e.g., faces, in each image with a known date. In some embodiments this is done by using an artificial intelligence based system to estimate the age of a detected face or object in each image with a known image date. A database is populated with object, e.g., face age and image date information, e.g., capture date information. In this way a database of image information is created associating known image capture dates with determined ages of objects, e.g., faces.

For purposes of explaining the invention faces of individuals will be used as the objects which are identified and with which a determined age is associated but the methods and apparatus can be used for other objects as well such as buildings which can be identified in a captured image and for which an age can be determined.

Once a set of face age to image capture dates has been generated and optionally stored in a database, the information can be, and sometimes is, used to determine the image date of one or more images with unknown dates, e.g., scanned images.

In various embodiments an image with an unknown image date is processed to identify one or more objects, e.g., faces, in the image with an unknown date. As a result of this processing at least a first object, e.g., first face, is identified in the image with an unknown image date. The age of the identified object, e.g., first face of a first person, is then determined. In some embodiments this involves using the artificial intelligence system which was used to determine the age of faces in images with known dates to estimate the age of the first face in the image. Once the age of the first face has been determined, e.g., estimated, the estimated age of the first face is used to determine the date, e.g., image capture date of the first image. This is done by using the estimated age of the first face and the known relationship between ages of the first face to image capture dates which is available from the database of image date to face age information to estimate the image, e.g., capture date, of the image having an unknown image date.

The determined image date of the scanned image is then associated with the scanned image which previously had an unknown capture date and used to support date ordered storage and/or retrieval of the scanned image. Thus, in accordance with the invention, scanned images can be, and sometimes are, stored in chronological order alone or in combination with captured digital images with known dates. In addition, queries or other processes relating to image capture date can be, and sometimes are, supported based on the determined image dates generated based on object, e.g., face, image age information.

In cases where an image of an unknown date includes multiple faces, the different faces can be, and sometimes are, identified. To the extent that more reliable information is available for one of the identified faces, the information corresponding to the face for which more reliable age information is available may be treated as more important to determining the image date than the information associated with other identified faces. In some embodiments an image date is based on what is considered the face in the image with the most reliable set of image capture date to age information.

The methods and apparatus of the present invention can be implemented in a variety of devices including servers and/or customer devices such as customer premise devices, cell phones and/or other devices including a processor capable of processing image data. Accordingly, while the methods and apparatus of the invention may be, and sometimes are, explained in the context of user device or server, it should be appreciated that the methods can be implemented in any type of device or system capable of preforming the steps of the method discussed herein. Furthermore, a variety of known face or object age determination methods or systems can be used to estimate the age of an object, e.g., image in a face and thus while an artificial intelligence (AI)

based system is used in some embodiments to determine the age of one or more faces, other non-AI based age determination techniques and/or systems can be used. Face age systems which are publicly accessible via the Internet can be, and sometimes are, used to estimate the age of an identified face in an image in some embodiments.

Various additional features and advantages of the present invention are discussed in the detailed description which follows.

DETAILED DESCRIPTION

Figure 1:
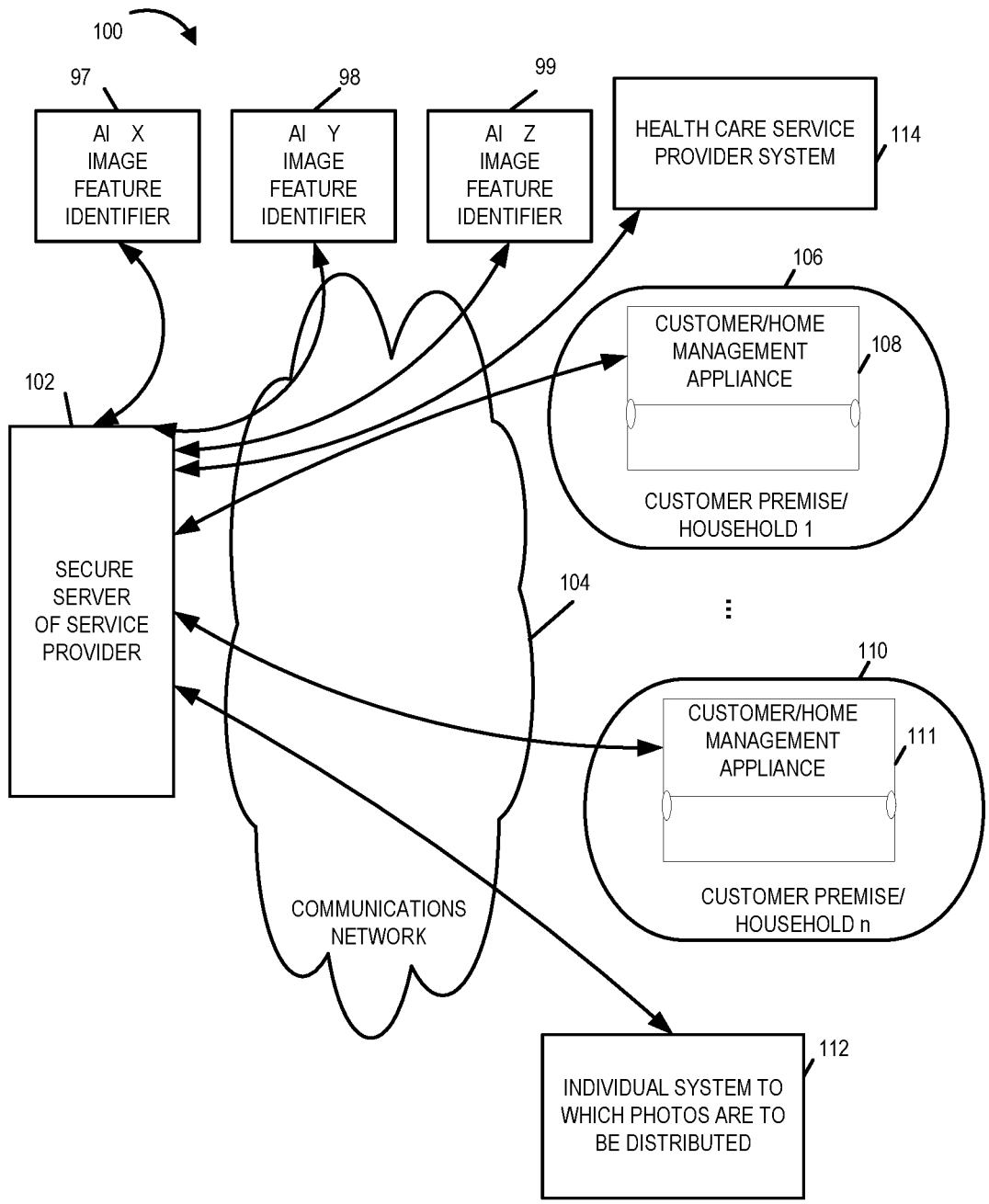
FIG. 1 illustrates an exemplary communications system in which a device, e.g., home appliance and/or server are incorporated, with the device determining the date of images in accordance with the present invention in at least some embodiments.

FIG. 1 illustrates an exemplary system 100 in which one or more appliances, e.g., a home appliances 108, 111 of the invention may be used to input data which can be added to a digital data store. The home appliances 108, 111 can scan images, e.g., documents or photos, and send the scanned images to one or more of the Artificial Intelligence (AI) systems 97, 98, 99 via communications network 104 and/or the secure server 102. In some embodiments the AI systems 97, 98, 99 identify features in the scanned images and report back to the home appliance 108, 111 from which a scanned image was received for processing. The information provided back to the appliance includes a list of identified features, one or more tags, e.g., words, corresponding to each identified feature and a separate confidence probability for each identified feature indicating the probability that the identified feature is in the scanned image. The different AI systems 97, 98, 99 may be, and sometimes are, different commercial systems running different AI processes and/or were trained using different image training sets. The AI systems 97, 98, 99 may, and sometimes will, return different feature detection results. As will be discussed below, an appliance 108, 111 can, and sometimes does, process the results provided by different AI systems 97, 98, 99 to determine what features were consistently determined to be present in a scanned image and what tag or tags, e.g., words, to associate with the scanned image when it is stored in memory to thereby facilitate word searching of images and/or image retrieval. In some embodiments, each AI system 97, 98, 99 is an AI device. Each AI device includes a processor, memory and an input/output interface. The processor controls the AI device to perform feature detection and return feature detection reports including suggested tags and an indication of a confidence level for each detected feature reported back to a device which supplied a scanned image.

The system 100 includes AI devices 97, 98, 99, a secure server 102 of a provider of a service, e.g., a home information and/or communications management service, a health care service provider system 114, an individual system 112 to which photos and/or other data is to be distributed and a plurality of customer premise locations 106, 110, e.g., household locations, each of which includes an home appliance 108, 111 implemented in accordance with the present invention. Various elements of the system 100 are coupled together via a communications network 104 which may be the Internet, a public telephone network, or a combination of one or more networks. While the communications network 104 may be a public network, communications links over the network may, and in various embodiments are, secured using encryption and/or other techniques. The communications links between the home appliances 108, 111 may be Virtual Private Network (VPN) communications links. Access to other systems, e.g., the health care service provider system 114, Internet search provider systems, E-mail systems, etc. via the home appliance may be protected by a firewall included in or managed by the service provider's secure server 102. The secure server 102 supports various functions and can interact with the home appliances 108, 111 of the present invention to provide a wide variety of services, information management functions, device information synchronization functions, communication service management functions, etc. in a secure manner. The services/functions supported by the secure server 102 include one or more of the following: i) media (e.g., image/film/document) archiving, documenting and distribution functions, ii) video phone service; iii) conferencing and on-line collaboration functions, e.g., allowing for simultaneous document viewing of documents or images by users each of which has an appliance of the present invention; iv) monitoring functions such as health monitoring functions; v) communications service management functions, vi) device data synchronization functions; and vii) household bulletin board functions, etc.

Figure 2:
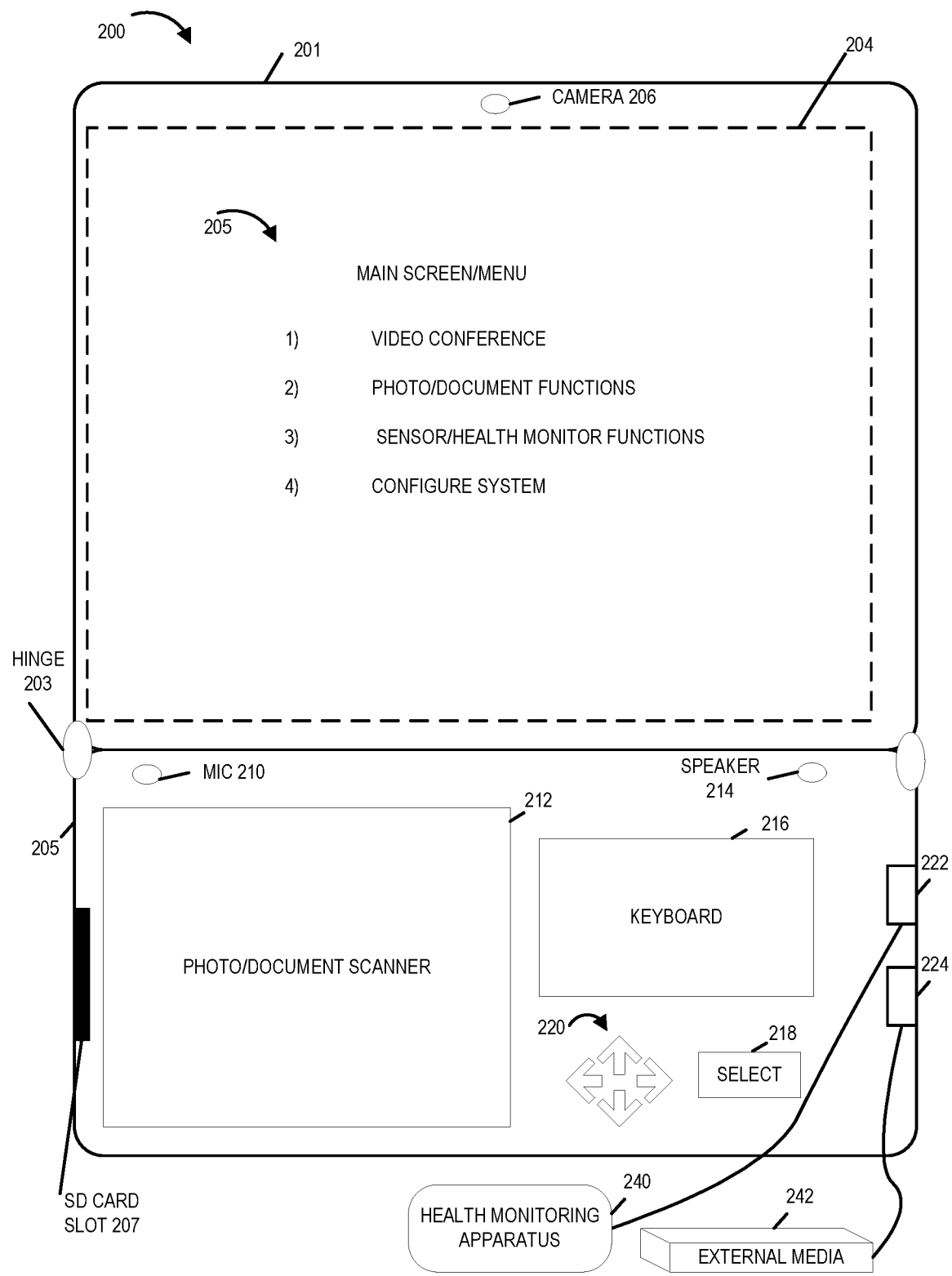
FIG. 2 illustrates an exemplary home appliance implemented in accordance with the invention which may be used in the system of FIG. 1 and which can determine image dates in accordance with the invention.

FIG. 2 illustrates an exemplary table top household appliance 200 implemented in accordance with the invention. The household appliance 200 includes a housing (201, 205 in combination) which is formed by an upper housing portion 201 and a lower housing portion 205 coupled together by a hinge 203. Mounted to the housing, and thus integral therewith, is a camera 206, display screen 204, a memory card slot 207, photo/document scanner 212, microphone 210, speaker 214, optional keyboard 216, arrow keys 220, select key 218 and various interfaces 222, 224. The display screen 204 may be, and in some embodiments is, a color touch screen. In various touch screen embodiments, keyboard 216 may be omitted. The interfaces 222, 224 may be wired interfaces, wireless interfaces and/or a combination of wired and wireless interfaces. In the case of wireless interfaces, the interface 222 or 224 may include both receiver and transmitter circuitry for receiving and transmitting signals. Internal to the appliance 200, and thus not visible in the FIG. 2 illustration, is a processor and memory. The processor controls operation of the device under direction of one or more modules, e.g., routines, stored in memory. The memory may also be used to store document images, photo images, etc. However, in order to keep implementation costs low, in some embodiments the apparatus 200 includes a relatively small amount of memory with the appliance relying on network connectivity and network storage for data intensive functions such as storing large photo albums and/or large numbers of documents. Additional storage can be added to the apparatus by inserting a memory card, e.g., SD, XD or other type of memory card, in card slot 207 or by attaching an external media device 242, e.g., a USB hard disc drive, to one of the I/O interfaces 222 or 224. The table top appliance 200 can, and sometimes does, perform optical character recognition and then perform various asset ownership and/or asset management/access control functions based on the scanned or user provided input. In other embodiments the device 200 communicates scanned documents and/or user input.

Various peripheral devices, e.g., a health monitoring apparatus 240, may be added to, e.g., coupled to, the appliance 200, to supplement the standalone appliance's capabilities. Various peripheral devices used in some embodiments include one or more of the following: a media reader such as one or more of the following: a slide reader, a cassette recorder reader (audio or video), a floppy disk reader, a 78 record playback drive, a reel to real tape reader, a film reader. The various readers digitize analog input which is then processed and stored in digital form, e.g., in one or more files and/or communicated via a communications network, e.g., to a network server for storage and/or distribution.

In some embodiments, where healthcare is supported, the appliance 200 is coupled to a monitoring apparatus for monitoring one or more sensor inputs. The sensor inputs may include one or more human health monitors, motion monitors and/or a variety of environmental condition monitors such as security sensors, temperature sensors, etc. A blood pressure monitor, glucose level monitor, heart rate monitor, and blood oxygen level monitor are among the various sensors and monitors which are used and supported in some embodiments. In some embodiments interface 222 is coupled to a sensor network from which the appliance 200 receives signals used to detect at least one of movement and proximity of a living being.

In some embodiments the appliance 200 is configured to generate an alarm and automatically initiate an audio/video conference in the event motion is not detected at predetermined intervals or during a monitoring period determined according to a programmed schedule. For example, the device 200 may be set to detect motion in the morning and, failing to detect the motion may set off an alarm based on the concern that the resident may have been unable to get up or make it to the room in which the appliance 200 is located to take medication at a scheduled time. The device 200 may be set to monitor for audio alarms, e.g., a person yelling for help, or for an alarm signal which may be transmitted to the device 200 by an item worn on an individual expected to use the appliance 200. In the event of an alarm condition, the appliance 200 may initiate a video conference call in which audio as well as video may be monitored and an individual at the customer premise at which the appliance 200 is located may communicate with an individual at another location, e.g., monitoring location, without having to get up or move, through the automatic use of the microphone (mic) 210 and speaker 214.

In the FIG. 2 example, display 204 illustrates an exemplary opening menu 205. The appliance 200 may be preconfigured to display the opening menu upon power up. The menu 205 lists various selection options including a first option corresponding to a video conference function, a second option corresponding to various photo and/or document functions, a third option relating to sensor and/or health monitoring functions and a fourth option relating to system configuration. Each of the functions may be highlighted by moving around on the screen using arrow keys 220 and by pressing select key 218 to indicate a user selection. Alternatively, in touch screen embodiments, a user of the appliance may select an option by touching the portion of the display screen 204 on which the desired option is displayed.

Upon selection of the video conference option, a user is presented with an additional screen that allows a user to initiate or join a video conference, e.g., by entering an identifier corresponding to a party or parties which are to be contacted or by accepting a received invitation to join a video conference initiated by another party, e.g., an individual using another appliance 200 of the present invention.

Upon selection of the photo/document functions option, a user is presented with a menu that allows the user to maker further selections relating to the scanning of photos or documents including the optional recording of voice commentary and an image of the individual providing the commentary, e.g., as part of creating an electronic collection of photos or documents, e.g., an album, which can be uploaded to a server, stored on the server and/or distributed by the server. Given the limited memory on the appliance 200, in some embodiments individual images and documents, along with any commentary or image of the person providing the commentary, are uploaded to a server via a network interface with the server then storing the multiple images and compiling them into albums in accordance with input received from the appliance 200.

Upon selection of sensor/health monitor functions, the user is provided with additional options and supported actions relating to the sensors and/or health monitoring peripheral device 240 coupled to the appliance 200. The appliance 200 supports automatic detection and configuration of peripheral devices. Accordingly, as a user adds or removes peripheral devices the options available upon selection of the sensor/health monitoring functions option will change depending on the sensors/health monitoring apparatus present at a particular point in time.

Upon selection of the configure system option, a user is provided with various configuration options, e.g., display and other setting options. A user may provide a security key, e.g., a Wired Equivalent Privacy (WEP) key, required to obtain wireless connectivity to a local network via setting entry options presented after the configure system option is selected. While a user may configure the appliance 200 manually, the device can also be configured remotely, e.g., by a server in the network to which the apparatus 200 is connected. A telephone interface and pre-programmed telephone number may be included in the apparatus 200 for obtaining configuration information via the public telephone network. However, where wireless or other Internet connectivity is supported, the appliance may connect via such a connection to a network based server to obtain additional or updated configuration information or to download new application software, e.g., relating to one or more peripheral devices which may be added to the apparatus 200.

Figure 3:
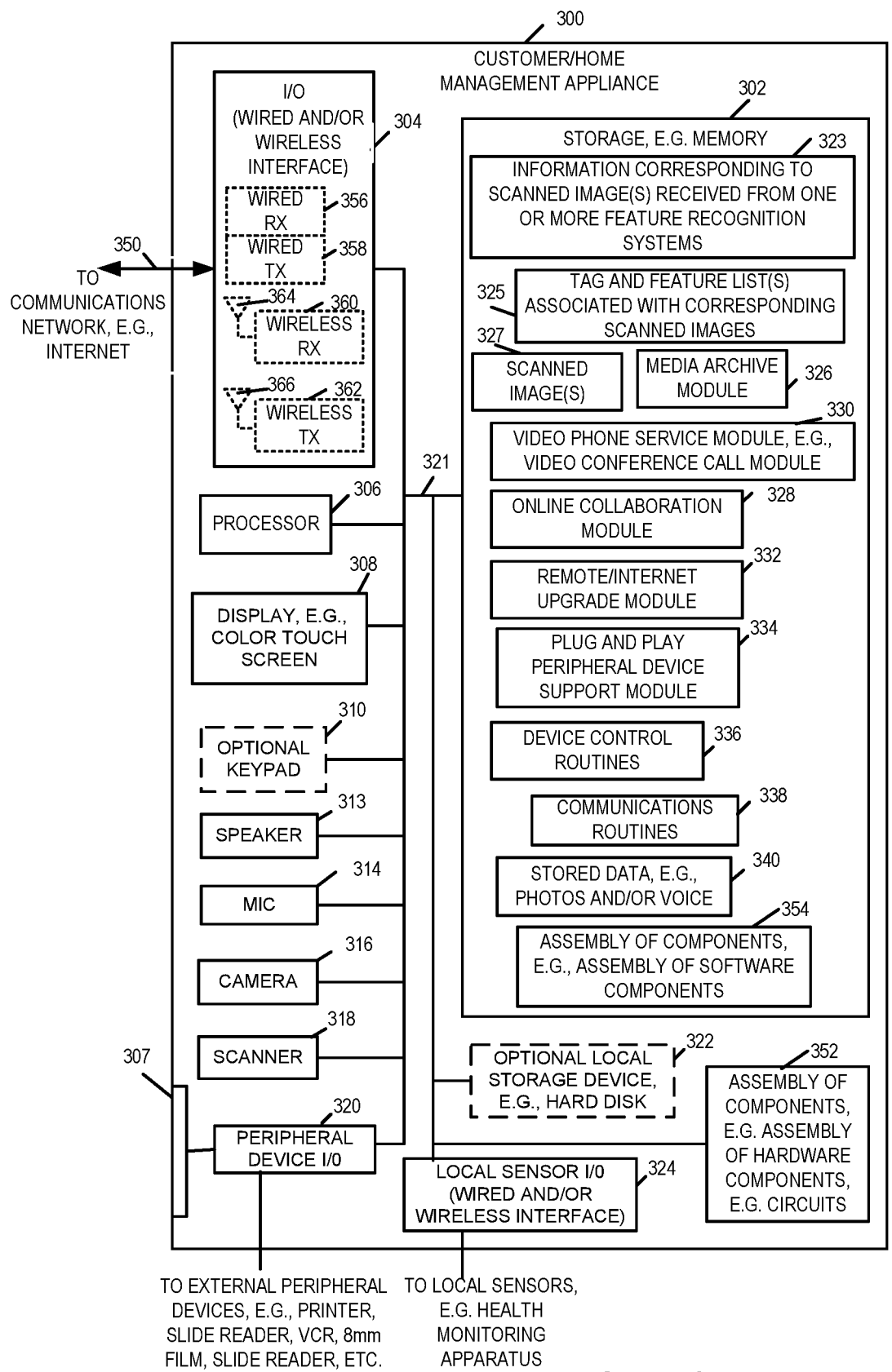
FIG. 3 is a more detailed illustration of the exemplary home appliance shown in FIG. 2.

FIG. 3 illustrates, in block diagram form, a customer/home management appliance 300 implemented in accordance with one exemplary embodiment of the present invention. The appliance 200 may include the same elements as the appliance 300 shown in FIG. 3. The appliance 300 includes an input/output interface 304, processor 306, assembly of components 352, e.g., assembly of hardware components, e.g., circuits, display 308, optional keypad 310, speaker 313, microphone 314, camera 316, scanner 318, peripheral device I/O 320, memory 302, optional local storage device 322 and a local sensor I/O 324 coupled together by a bus 321 which allow the various components to exchange data and other signals. The various components are securely, e.g., permanently, mounted to a housing and thus are integral to the appliance 300. The housing may be a single fixed assembly or a multi-part housing such as the multipart housing including upper and lower parts 201, 205 shown in the FIG. 2 example.

The I/O module 304 serves as a network interface and couples the appliance 300 to a communications network, e.g., the Internet and/or public telephone network as indicated by communications link 350. The I/O 304 may be implemented as a wired and/or wireless interface. In some embodiments, the I/O interface 304 includes a wired receiver (RX) 356 and a wired transmitter (TX) 358. In some embodiments, the I/O interface 304 includes a wireless receiver (RX) 360 coupled to receive antenna 364 and a wireless transmitter (TX) 362 coupled to transmit antenna 366. In one embodiment the I/O 304 includes an Ethernet port for connection to wired networks, a telephone jack for connection to standard telephone networks and also a wireless interface, e.g., a WiFi interface for connecting to a wireless network. Other types of network interfaces can be supported such a conventional cell phone interfaces thereby allowing the customer appliance to communicate with other devices and network servers using any one of a wide variety of communications networks.

Processor 306, e.g., a CPU, controls operation of the customer appliance 300 in accordance with one or more control routines stored in memory 302. The processor 306 controls, among other things, the presentation of menus and prompts on display 308 and the disposition of scanned images and/or other files in accordance with user input, e.g., menu selections and destination information, which may be entered by a user of the customer appliance 300. The display screen 308 is used for displaying menus, scanned images, and other information. In some embodiments the display screen 308 is implemented as a color touch screen. In touch screen embodiments the keypad 310 may be omitted. Accordingly, the keypad 310 is shown as an optional element. In order to provide audio output, e.g., to allow for the playback of recorded commentary and/or to support audio output as part of a video conference call, the appliance 300 includes speaker 313. To support capture of audio, e.g., to allow for recording of picture commentary and/or the input of voice as part of a video conference call, the appliance 300 includes microphone (mic) 314.

Camera 316 is provided for capturing still images and/or video of the user of the appliance 300. In the case of commentary provided relating to a scanned photo, the camera can, and in some embodiments is, used to capture an image or video of the person providing the commentary. The camera also supports video capture enabling video conference calls from the appliance 300. The camera 300 is usually mounted at a location on the appliance housing from which the image of a user of the appliance can be easily captured. In some embodiments, the camera 316 is mounted above the display screen 308 as shown in FIG. 2.

Scanner 318 allows photos to be scanned. Scanned images may, and in some embodiments are, automatically reoriented prior to display thus allowing an image to be scanned in any direction with the appliance re-orienting the image after scanning. In some embodiments scanner 318 is implemented as a small flatbed scanner capable of scanning 3×5 images. Such a size is well suited for standard photos. Larger scanning bed sizes may also be used. In other embodiments the scanner is implemented as a device having a slot or feed input and the item to be scanned is moved over a scanning area. Accordingly, depending on the particular embodiment, the scanner 318 may be implemented in different formats. The scanner 318 can be used a document scanner allowing documents to be scanned and displayed as part of a video phone conference.

The peripheral device input/output interface 320 serves to interface the device 300 with a variety of external optional peripheral devices as well as a memory card slot 307. The memory card slot 307 allows for memory cards often used for the storage of photos to be read and/or written. Thus, not only can the appliance 300 be used to document and archive physical photos which can be scanned, but can also be used to add commentary to images which were captured by a modern digital camera. Thus, the appliance 300 remains relevant and useful even as a user may migrate from film and photos to electronic cameras and electronic photos.

Among the peripheral devices which are supported by the interface 320 are various optional peripheral devices such as a printer, slide reader, VCR, 8 mm film reader, slide reader, etc. These peripheral devices may be purchased by a user at the time of purchase of the appliance or later, e.g., on an as needed basis. Peripheral devices added to the customer appliance 300 are automatically detected, configured if necessary and the added functionality and menu options made possible by the addition of the peripheral device are automatically added by the appliance 300 to its set of menus. The peripheral device I/O interface 320 may support USB devices. In addition to the interface 320, a sensor interface 324 is provided for receiving local sensor input. The sensor interface 324 may include a wired and/or wireless receiver/transmitter. A large variety of sensors may interface with the appliance via the local sensor I/O interface 324. Sensors which may be coupled to the appliance 300 via interface 324 include, e.g., health monitoring sensors, motion sensors, alarm sensors, etc. As discussed above, peripheral devices in the form of medical sensors may be paid for and coupled to the appliance 300 at any time. Thus, a user of the appliance 300 may purchase the appliance 300 for, e.g., photo and video conferencing functions, and an insurance company may purchase and provide the user a health monitoring device at some later time to be used with the appliance 300, e.g., at the insurer's expense. Health monitoring devices may include blood sugar level monitors, blood pressure monitors, heart rate monitors, etc., which may be coupled to the device 300 via interface 324. Information provided by sensors via interface 324 can, and in various embodiments are, uploaded by the appliance 300 to a network server for forwarding to a health care provider, e.g., a doctor or health insurance provider. Thus, the appliance 300 can be used to support health monitoring functions in addition to supporting video conferencing and photo achieving.

Appliance 300 can, and in some embodiments is, configured to detect various alarm conditions and take action in response to an alarm condition. For example, in response to the failure to detect expected motion, or in response to detecting sudden motion indicative of a fall, the appliance 300 may initiate an audio or video conference with a monitoring service or healthcare provider which can then assess the situation and make an informed decision as to whether or not to send, e.g., dispatch, medical help. Smoke and/or heat sensors may be used to trigger a fire alarm which, like a medical alarm, may trigger a video conference call which can result in emergency service personal being dispatched, e.g., fire fighters and/or police may be dispatched to the customer premise.

For cost reasons the memory 302 may be relatively small. The memory 302 may be non-volatile and can be used to store various modules, e.g., routines, which support various device functions. In addition, memory 302 may have the capacity to store a limited number of photos and corresponding audio/video commentary which can then be uploaded to a network storage device via network interface 302.

In the FIG. 3 embodiment, memory 302 includes information 323 corresponding to scanned images received from one or more feature recognition systems which may be stored with the associated tag/feature lists in memory portion 325 or in scanned image portion 327, a media archive module 326, a video phone service module 328, e.g., a conference call module, an online collaboration module 330, remote/Internet upgrade module 332, a plug and play peripheral device support module 334, device control routines 336, communications routines 338 and stored data 340, e.g., photos and/or audio/video commentary. The information stored in memory portion 325 can be, and sometimes is feature and tag information received from multiple different feature recognition systems with a set of information being stored for each scanned image which was subject to feature recognition and tag list generation processing. Thus, in some embodiments 325 includes a separate tag list and/or other information for each individual scanned image stored in memory portion 327.

While memory 302 may be somewhat limited in size for cost reasons, in some embodiments an optional hard disk 322 is included to provide for ample storage for digital images, video and audio on the appliance 300. Cloud or network storage is also supported making optional hard disk 322 less important in cases where reliable network connectivity is available.

Media archive module 326 controls the scanning, documentation (audio and/or video documentation) of images such as photos and physical documents. As discussed above, photos can be scanned, stored in digital form with captured audio and/or video commentary and distributed, e.g., via the network interface 304 under control of media archive module 326. Video conference module 328 is responsible for handling video conference call establishment and video conference call maintenance. On-line collaboration module 328 allows users to establish on-line collaboration sessions which may involve use of the video conference capabilities available from module 330 as well as document exchange capabilities made possible by the availability of the scanner 318. Remote/Internet upgrade module 332 allows for the appliance 300 to exchange data and/or control information with a remote server via a communications network such as the Internet or a public telephone network. Remote upgrade module 332 makes it possible for the routines in memory 302 to be updated, added to or replaced via a remote network server. Thus, new applications and routines may be retrieved and installed automatically, e.g., as new peripheral devices are detected. Plug and play peripheral device support module 334 is responsible for detecting new peripheral devices, retrieving corresponding applications or routines from the network if required, automatically installing the retrieved routines and for taking any other action required to automatically support various peripheral devices attached to the customer appliance 300. The plug and play support made possible by module 334 allows a user to add supported peripheral devices without have to be concerned with having to manually configure the appliance 300 to support the peripheral device.

Device control routines 336 include a variety of routines, including alarm generation and detection routines, data storage control routines, etc. that support or control the device to operate in accordance with the methods of the present invention.

Communications routines 338 support voice and data communications and enable communications sessions to be established via the appliance 300. Stored data 340 includes stored photos, voice and/or image data corresponding to commentary relating to scanned or input photos or documents. The stored data may also include menu information and/or other system configuration information. The system configuration information may be preloaded and/or automatically updated as peripheral devices are added and/or the device is reconfigured to support new applications. Updating of configuration information stored in memory 302 may be done automatically by a remote server coupled to the customer appliance 300 via a communications network. Data 340 may include alarm settings which determine when a video conference call is to be initiated, e.g., in response to a fall sensor, heat sensor, smoke alarm or another monitoring device which may supply signals to the customer appliance 300. Storage 302, e.g., memory, further includes an assembly of components 354, e.g., assembly of software components, e.g., software routines and/or software modules.

In view of the above discussion, it should be appreciated that the appliance of the present invention is easy to set up, simple to use, supports a wide variety of applications and can be updated remotely and/or through the addition of add on peripheral devices which can increase the number of supported functions. The appliance of the present invention supports enough functions that it can appeal to a wide range of family members and/or age groups. Since purchase of the appliance can be justified by the many non-health related functions it supports, purchase of the appliance can be motivated without using the health monitoring features as a primary reason to purchase the appliance. Health care providers can cover the cost or supply health monitoring related peripheral devices and can take advantage of the remote reporting and alarm features supported by the appliance thereby potentially reducing the cost of health care services without saddling health insurance companies with the cost of the communications interface and/or network related costs that might be associated with having to provide a complete monitoring system.

Figure 4:
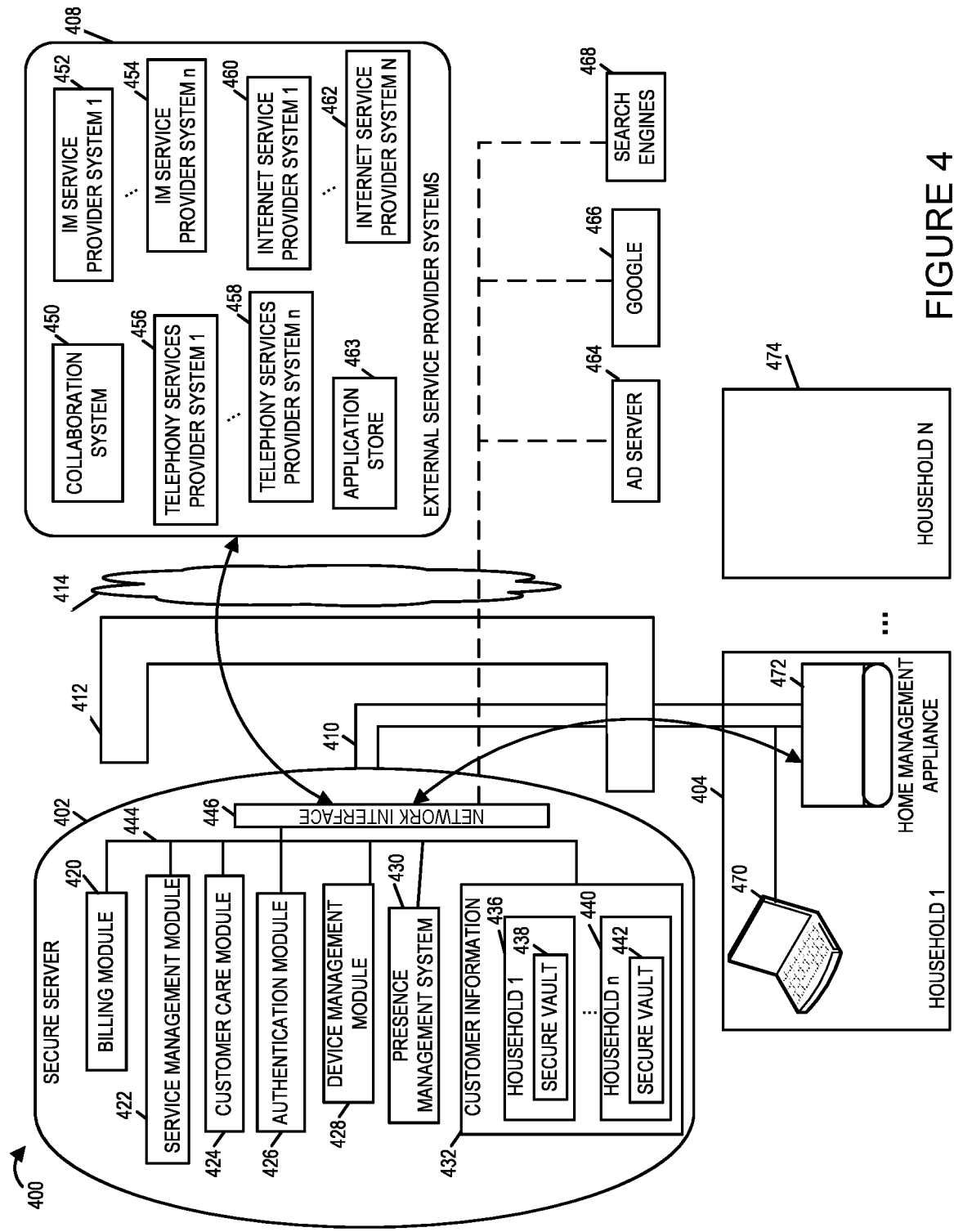
FIG. 4 is another exemplary communications system implemented in accordance with the present invention which includes more detail than is included in FIG. 1.

FIG. 4 illustrates a system 400 implemented in accordance with the present invention in more detail than the FIG. 1 illustration. As illustrated in FIG. 4, a variety of households 404, 474 include a home management appliance 472 implemented in accordance with the present invention and one or more other electronic devices 470 which can be used to access and distribute information, e.g., household member schedule information, contact information, etc.

The households 404, 474 are coupled to the secure server 402 via secure communications links such as the link 410. The secure links may pass over a public communications network such as the network 414, e.g., the Internet or public telephone network, but are secured through the use of one or more security techniques, e.g., encryption techniques. The link 410 may be a VPN communication link. A firewall 412 protects the secure server from security threats and also protects the home management appliance 472 from security threats. Communications from the home management appliance to Internet sites, communications services, E-mail servers, etc. are routed through the secure server 402 and firewall 412 to protect the home management appliance 472 from security threats without imposing the need for the user of the home management appliance 472 to manage or even be aware of the firewall 412.

The software and/or other applications are loaded onto the home management appliance 472 via the secure server 402. In some embodiments the user is prohibited from loading applications or software onto the home appliance 472 except via the secure server 402. Thus, the secure server 402 can check applications before they are loaded onto the home appliance 472 greatly reducing the threat of accidental loading of viruses and also allowing the secure server 402 to make sure that only compatible applications are loaded onto a home appliance 472. The secure server 402 may be responsible for updating appliance settings and configuration as applications are loaded and used in combination on the home appliance 472. Since home appliance configuration and management issues are implemented on the secure server 402 by the service provider, and the household member using the home management appliance 472 is shielded from many device management and configuration issues commonly encountered when software and peripherals are loaded onto or added to personal computers.

The secure server 402 includes various modules in addition to customer information 432, e.g., household information. The modules include a billing module 420, a service management module 422, a customer care module 424, an authentication module 426, a device management module 428, a presence management module 430. The various modules can interact with the home management appliance 472 via network interface 446 and also with other external systems 408 via the interface 446. The customer information 432 includes information 436, 440 corresponding to each of the households 404, 474 serviced by the secure server 402. The household information (household 1 information 436, . . . , household n information 440) includes information stored in a secure manner, e.g., information stored in what is referred to as a secure vault (438, . . . , 442), respectively. The information in a households secure vault may be encrypted and is normally backed up. A secure vault, e.g., secure vault 442, used to store household information, e.g. for household n, may be distributed over a number of storage devices and may be implemented using a secure cloud based storage embodiment and need not be, but may be, implemented using storage internal to the secure server 402.

External service provider systems 408, which may be accessed from the home management appliance 472 via the secure server 402, include a collaboration system 450, one or more telephone service provider systems 456, 458, one or more instant message service provider systems 452, 454, an application store 463, and one or more internet service provider systems 460, 462. Various other external devices such as ad server 464, a Google server 466 and a search engine server 468 may also be accessed via the home management appliance 472 and secure server 402. While not shown in FIG. 4, one or more health care service provider systems 114 may also be accessed via home management appliance 472 and secure server 402.

A secure vault, e.g., secure vault 438, can be used to store medical records, receipts, business records, photos, schedule information, to do lists, etc. with the amount of access to such information being controlled and/or restricted based on information entered via the home management appliance 472 of the household, e.g. household 1 404, to which the secure vault, e.g., secure vault 438, corresponds. A user of the home management appliance 472 can manage a households communications services, including the porting of telephone numbers and change of telephone service providers, directly from the home management appliance 472 by providing change/service management information to the secure server 402. The service provider operating the secure server 402 then contacts the various service providers which need to make changes to implement the requested communications service changes in a secure manner eliminating the need for the user of the home management appliance 472 to directly contact the individual communications service providers affected by the requested change in communications service. E-mail, instant messaging and other communications services used by household members can also be managed in a secure manner form home management appliance 472.

Figure 5:
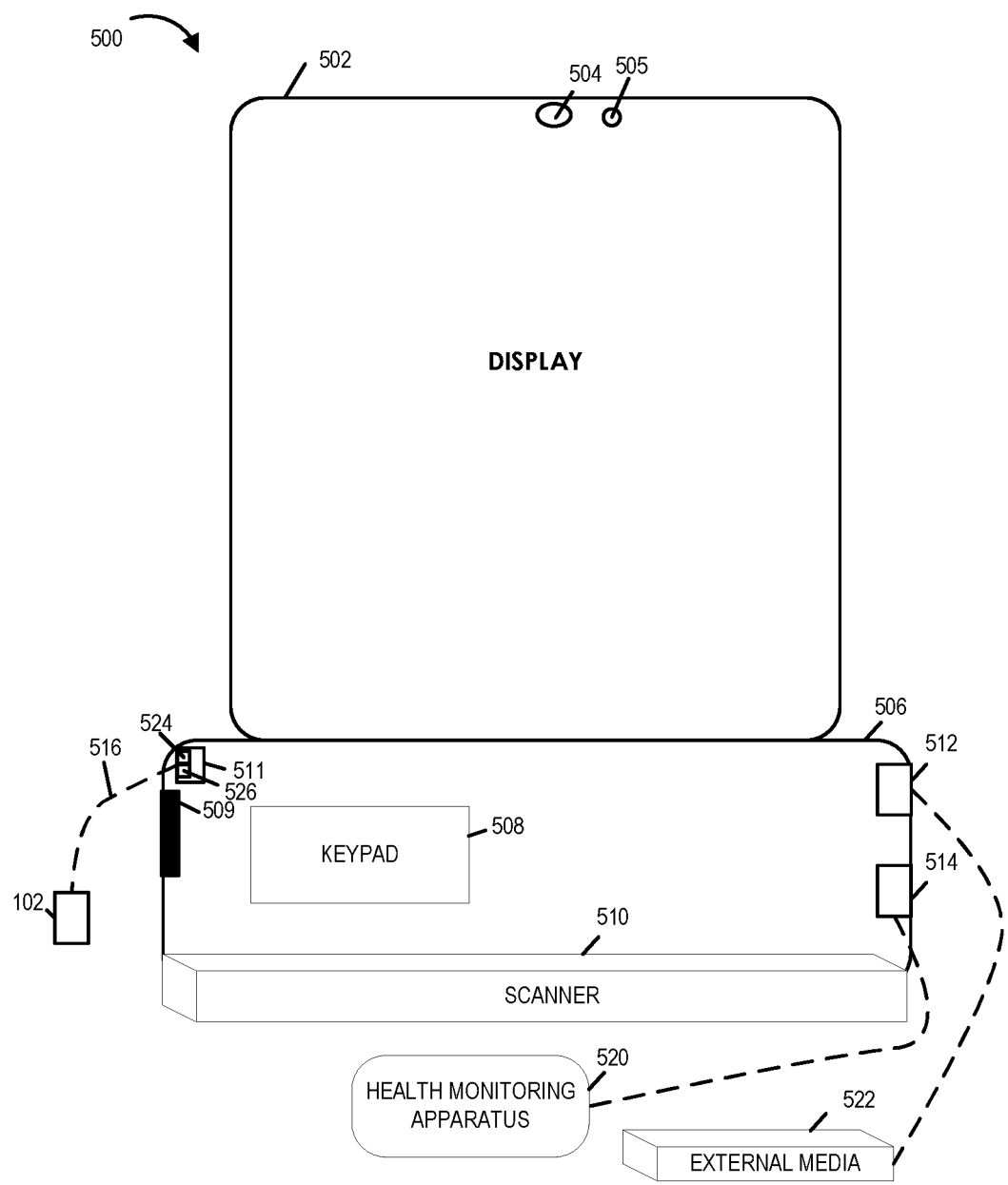
FIG. 5 illustrates a home appliance with a detachable display and scanner implemented in accordance with one exemplary embodiment.

FIG. 5 illustrates a home appliance 500 which may be used as the home appliances shown in FIGS. 1 and 4. The home appliance 500 includes a display 502, base unit 506 and scanner 510. The display device 502 may include a camera 504 and/or microphone (mic) 505 and may be touch sensitive. The scanner 510 may be integrated with the base unit 506 or detachable. The base unit 506 includes interfaces 512, 514 for coupling the base unit 506 to external peripheral devices such as health monitoring apparatus 520 and external media 522. The base unit 506 further includes a keypad 508 and a memory card slot 509. The base unit 506 also includes an interface 511 for securely coupling the base unit 506 to the secure server 102 via a communications network 516. Interface 511 includes a receiver 524 and a transmitter 526.

Figure 6:
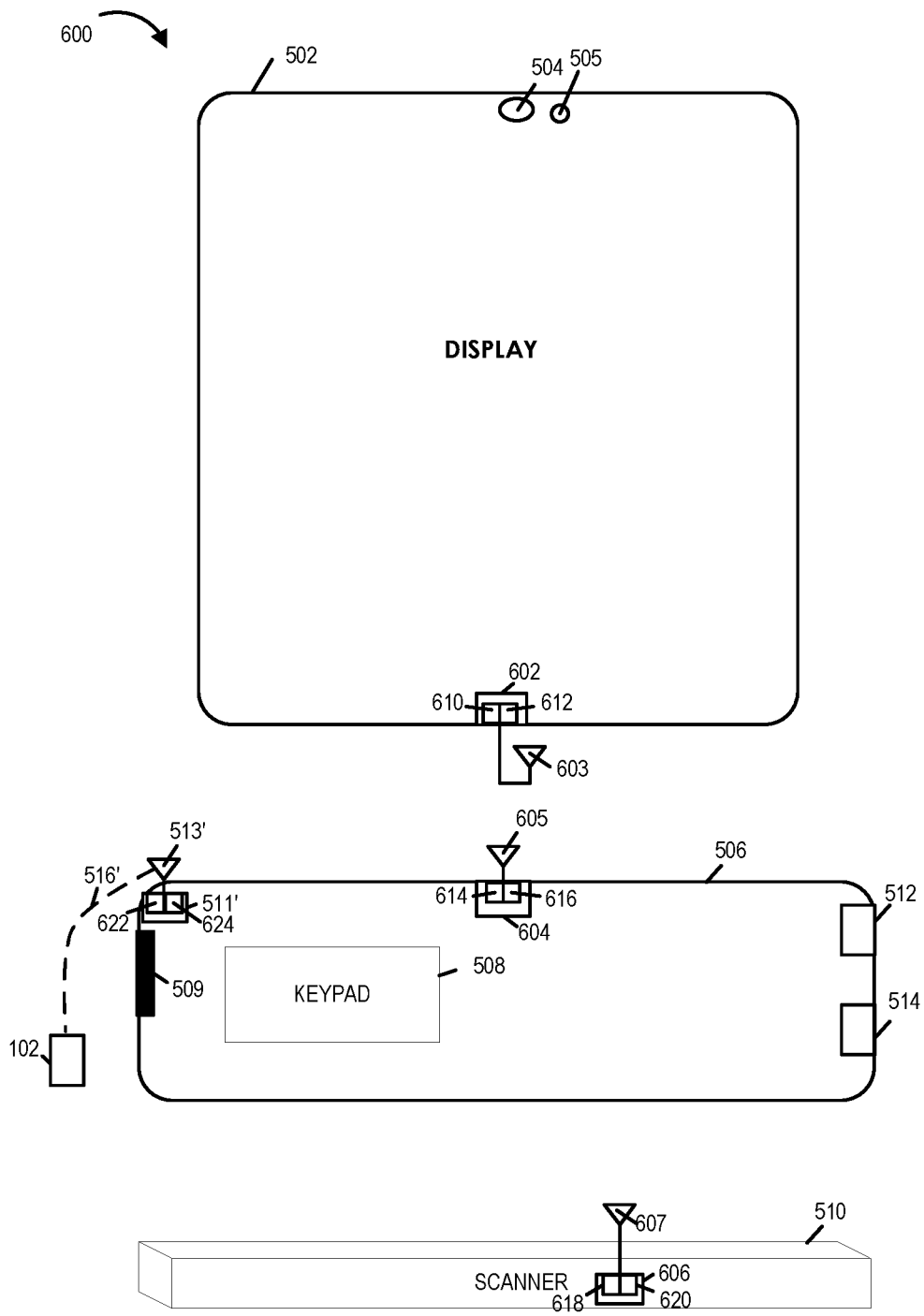
FIG. 6 shows how the components of the system shown in FIG. 5 can be detached from one another and used as they communicate wirelessly with each other.

FIG. 6 illustrates an exemplary home appliance 600 which may be used as the home appliances shown in FIGS. 1 and 4. Exemplary home appliance 600 includes a display 502, a base unit 506 and scanner 510. FIG. 6 shows how, in one embodiment the display 502, base unit 506 and scanner 510 may be detached from one another. The various components (502, 506, 510) may communicate wirelessly with one another, e.g., via wireless interfaces (602, 604, 606), and corresponding antennas (603, 605, 607), respectively. Wireless interface 602 includes a wireless receiver 610 and a wireless transmitter 612. Wireless interface 604 includes a wireless receiver 614 and a wireless transmitter 616. Wireless interface 606 includes a wireless receiver 618 and a wireless transmitter 620. The display device 502 may be a tablet type device including a touch sensitive screen, display capability, some processing capability and the ability to wirelessly interact with the base unit 506, e.g. a base station, and via the base station 506, including wireless interface 511' and antenna 513' and wireless communications link 516', the secure server 102. Wireless interface 511' includes a wireless receiver 622 and a wireless transmitter 624.

Figure 7:
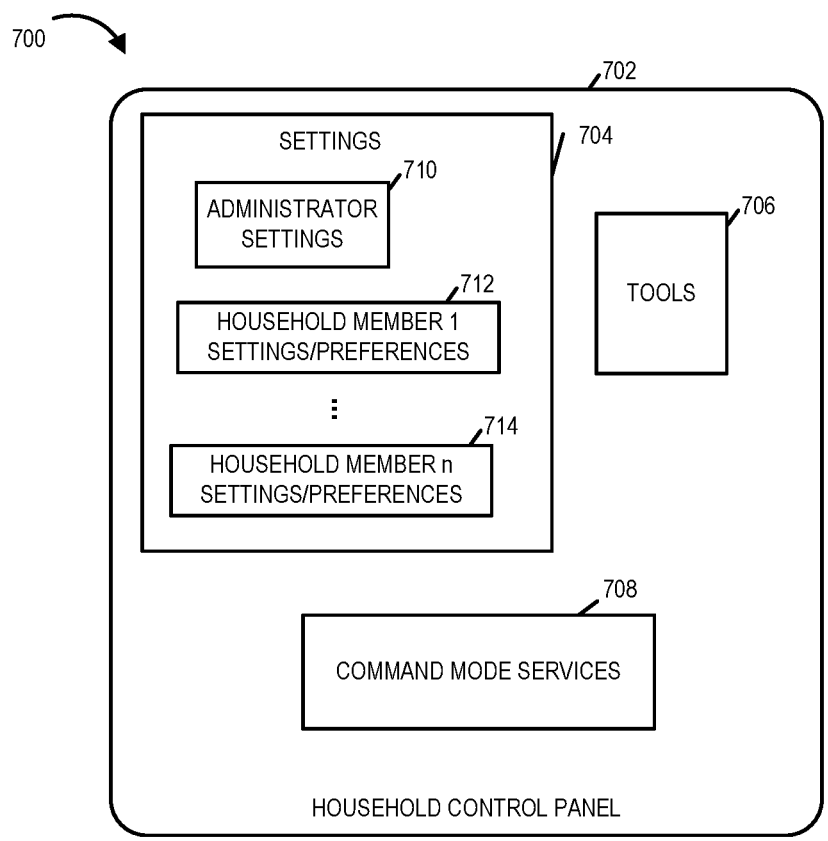
FIG. 7 illustrates a household control panel which may be accessed via the home appliance of the present invention.

FIG. 7 illustrates a household control panel 700 implemented in accordance with one embodiment of the present invention. The household control panel 700 may be displayed on the display 502 and accessed via the home management appliance. Functions and/or services provided via the control panel may be implemented partially or fully on the secure server 102. Exemplary household control panel 700 includes a setting portion 704, a tools portion 706 and a command mode services portion 708. The settings portion 704 includes administrator settings 710, and household settings/preferences corresponding to each household member (household member 1 setting/preferences 712, . . . , household member n settings/preferences 714).

Figure 8:
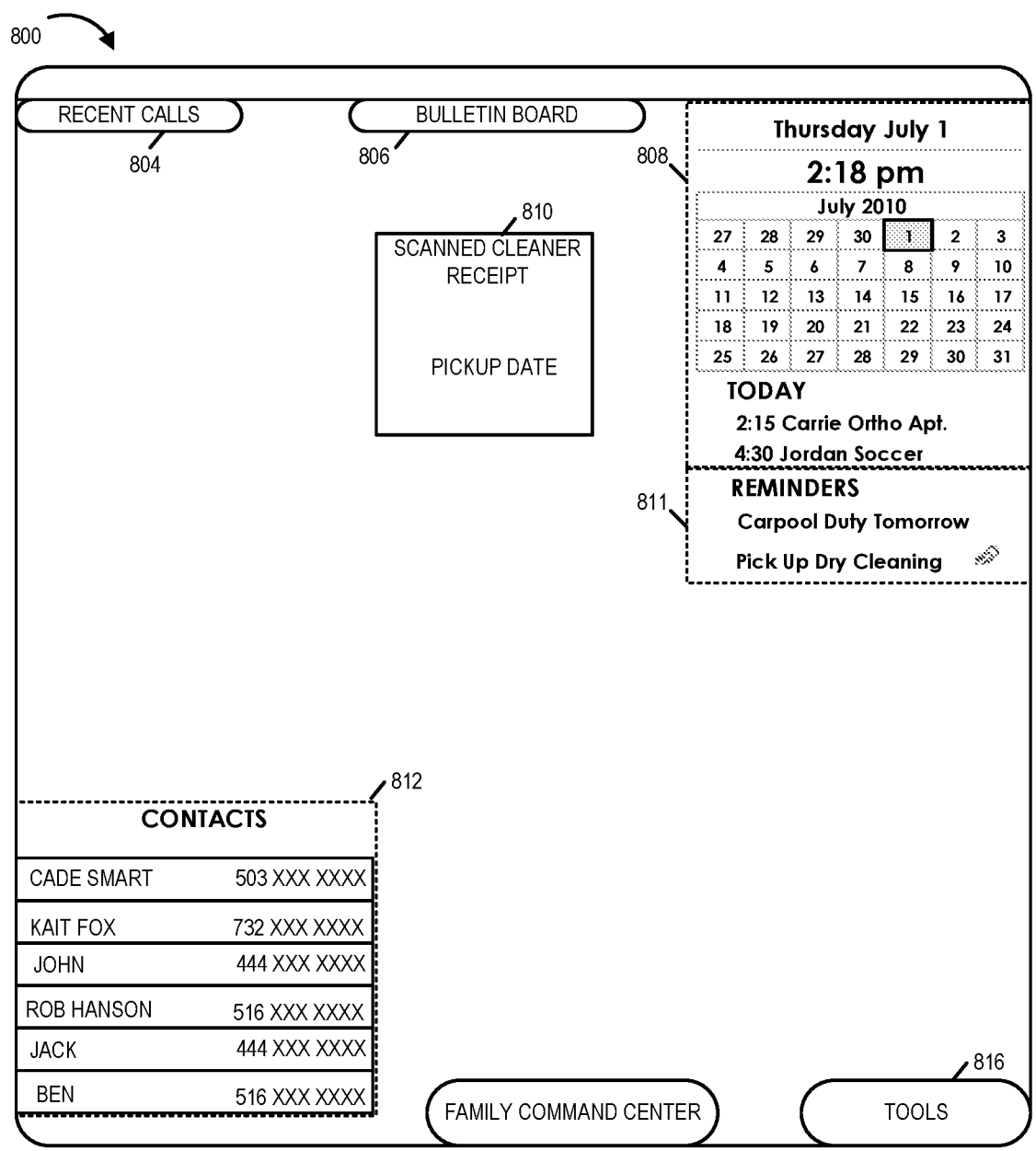
FIG. 8 illustrates a family command and control center screen which may be accessed and used to communicate household information, access household calendars, etc.

FIG. 8 illustrates a family command center 800 which may be displayed on and accessed via the home management appliance. The family command center 800 is an application and corresponding display interface which allows for the management of a wide variety of household information including contacts 812, reminders 811, a calendar 808, scanned receipts 810, call information 804, tools 816 and a bulletin board 806 which can be used for posting notes and/or other information intended for multiple family members.

Figure 9:
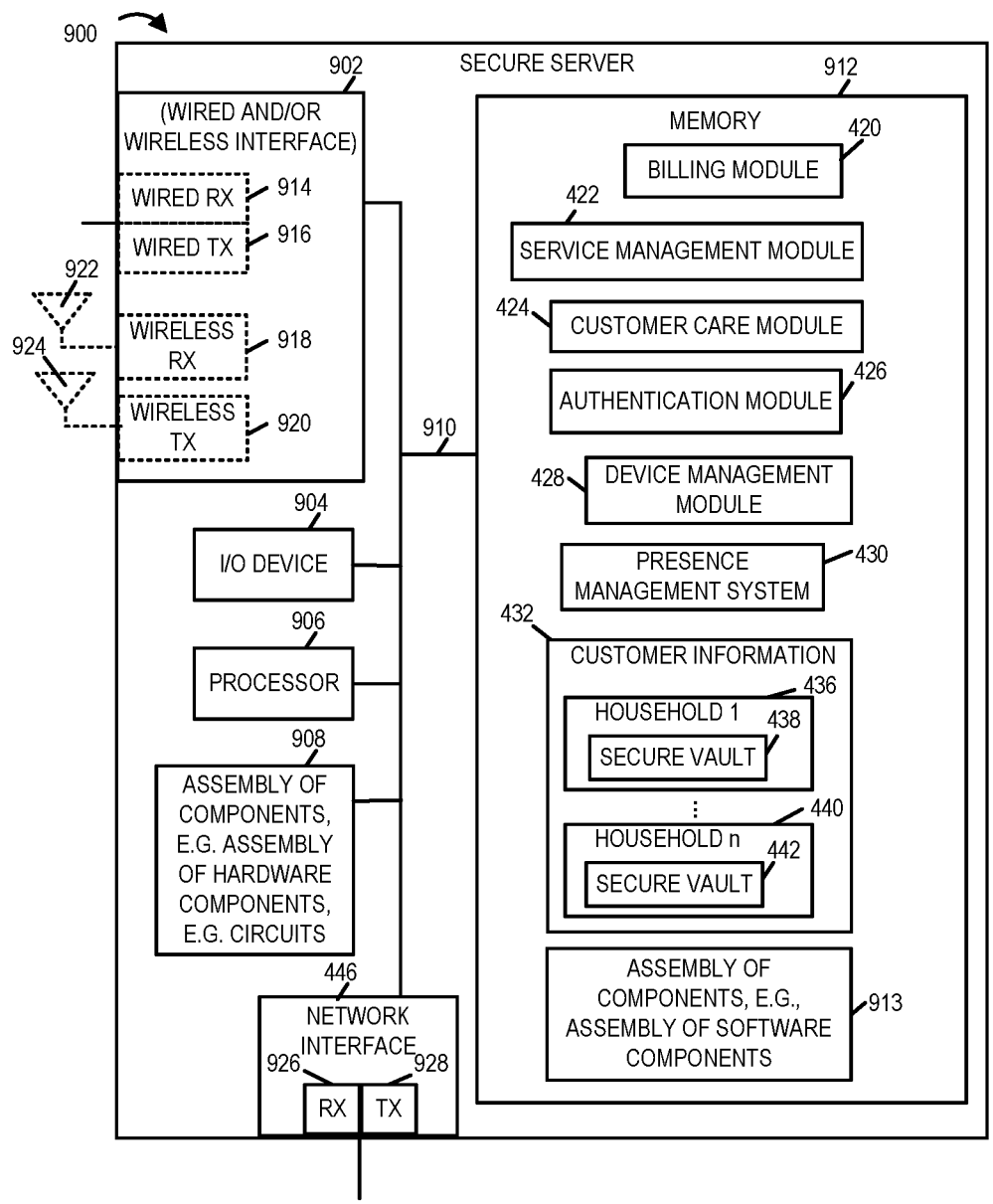
FIG. 9 illustrates a secure server which may be used as the secure server of the system shown in FIGS. 1 and 4, and which interacts with the home appliance in a secure manner to provide a wide range of services to a household and the various members of a household.

FIG. 9 is a drawing illustrating a secure server 900 which may be used as the service provider secure server (102 or 402) of the systems shown in FIGS. 1 and 4. Secure server 900 includes a wired and/or wireless interface 902, I/O device 904, processor 906, e.g., a CPU, assembly of components 908, e.g., an assembly of hardware components, e.g. circuits, network interface 446, an memory 912 coupled together via a bus 910 over which the various elements may interchange data and information. Memory 912 includes billing module 420, service management module 422, customer care module 424, authentication module 426, device management module 428, presence management system 430, customer information 432, and assembly of components 913, e.g., an assembly of software components, e.g. software routines and/or software modules. Customer information 432 includes sets of household information corresponding to a plurality of different households (household 1 data/information 436, . . . , household n data/information 440. Household 1 data/information 436 includes secure vault 438. Household n data/information 440 includes secure vault 442.

Wired and/or wireless interface 902 includes one or more or all of: wired receiver (RS) 914, wired transmitter (TX) 916, wireless receiver (RX) 918 coupled to receive antenna 922, and wireless transmitter (TX) 920 coupled to transmitter 924. In some embodiments, the wireless receiver 918 and wireless transmitter 920 use the same antenna or same set of antennas. Network interface 446 includes a receiver (RX) 926 and a transmitter (TX) 928.

Figure 10:
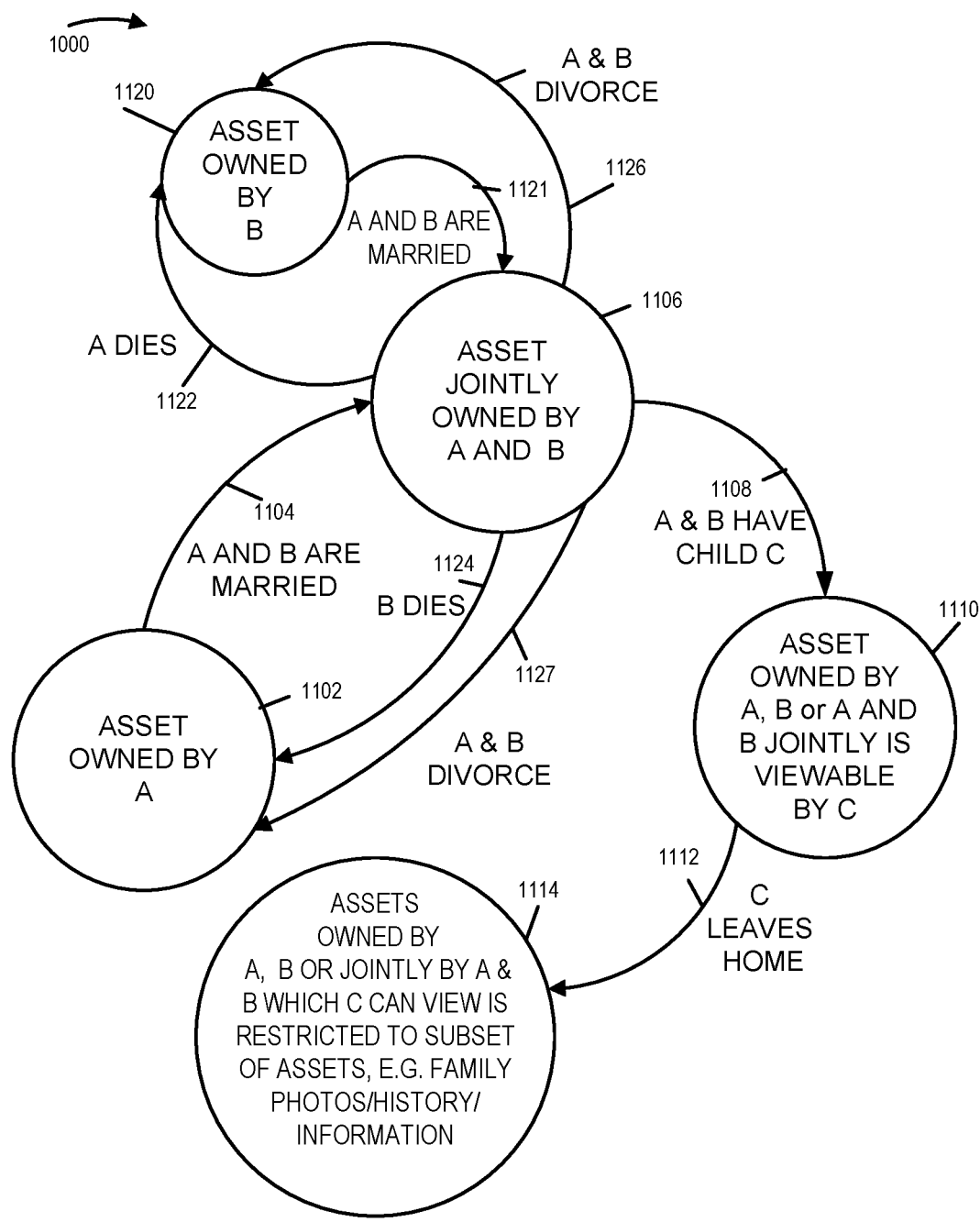
FIG. 10 illustrates how asset ownership and/or access rights may be and sometimes are automatically changed in response to one or more life events that can be specified by a user and/or determined or verified based on one or more scanned documents.

FIG. 10 illustrates how asset ownership and/or access rights may be, and sometimes are, automatically changed in response to one or more life events that can be specified by a user and/or determined or verified based on one or more scanned documents.

The diagram 1000 shows a variety of asset ownership/access states 1120, 1106, 1110, 1102, 1114 and the corresponding life events that can be indicated by a user and/or automatically detected by scanning a document such as a marriage certificate, death certificate, birth certificate, divorce document, lease indicating a child has moved to a new address. Arrows are used to indicate transitions, e.g., changes in ownership and/or access that can be, and sometimes is, implemented automatically in response to detection of the corresponding event.

For example state 1120 represents the existence of a set of digital assets which are owned by a person represented by the letter B. Ownership of the stored assets, e.g., records, pictures, legal documents, audio records, etc. transitions in step 1121 to a joint asset ownership state in response to detection of a marriage between individual A and individual B. State 1106 indicates the state of jointly owning assets stored in the digital vault maintained for the family including married individuals A and B. The ownership state of the assets maintained for the couple A, B changes in response to detecting one or more conditions such as death of individual A, death of individual B or divorce of A & B.

In the case of death of individual A ownership of the assets stored in the digital store that are jointly owned by A and B automatically transitions in step 1122 to ownership by individual B 1120. In the case of death by individual B ownership of assets stored in the digital store that are jointly owned by A and B automatically transitions in step 1124 to ownership by individual A 1102.

In the case of divorce of married couple assets which are jointly owned 1106 are divided between A & B based on previous ownership and/or a divorce document. Steps 1126 and 1127 represent the transition of assets form the joint ownership state 1106 to the individual ownership states 1120, 1102 as a result of divorce.

Detection of a birth or adoption of a child can, and sometimes does, trigger automatic creation of a secure data store in the family digital vault for the child while also automatically granting the child access rights to some or all of the parents data stored in the family data vault, e.g., maintained by the secure server 402. These operations are represented by step 1108.

A child leaving a home, e.g., as indicated by the scanning of a lease with the child's name and new home address on it, can, and sometimes does, trigger an automatic change in the child's right to access content corresponding to his/her parents as represented by step 1112. After a determination is made that a child has left the family home the child is still permitted to access some portions of the family vault, e.g., the portions 1114 including general family history, family photos and the child's own personal information but may be, and sometimes is, restricted from access to some other content in the family vault the child had access to prior to leaving the home. The content which the children are to have access to can be, and sometimes are, determined by general rules specified by one or both the parents which can be applied uniformly to one or more children whenever a child is detected on indicated to have left the home.

The ownership and access changes may be, and sometimes are, determined by the customer home appliance 300, e.g., under control of the processor included therein, based on user input and/or one or more scanned documents and then communicated via a communications network to the secure server which maintains the secure family vault. In other embodiments the home appliance or another device provides user input and/or scanned documents to the secure server 402 which then makes asset ownership and/or asset access changes, e.g., in accordance with the diagram of FIG. 10 and/or the method shown in FIG. 11.

Figures 11, 11C:
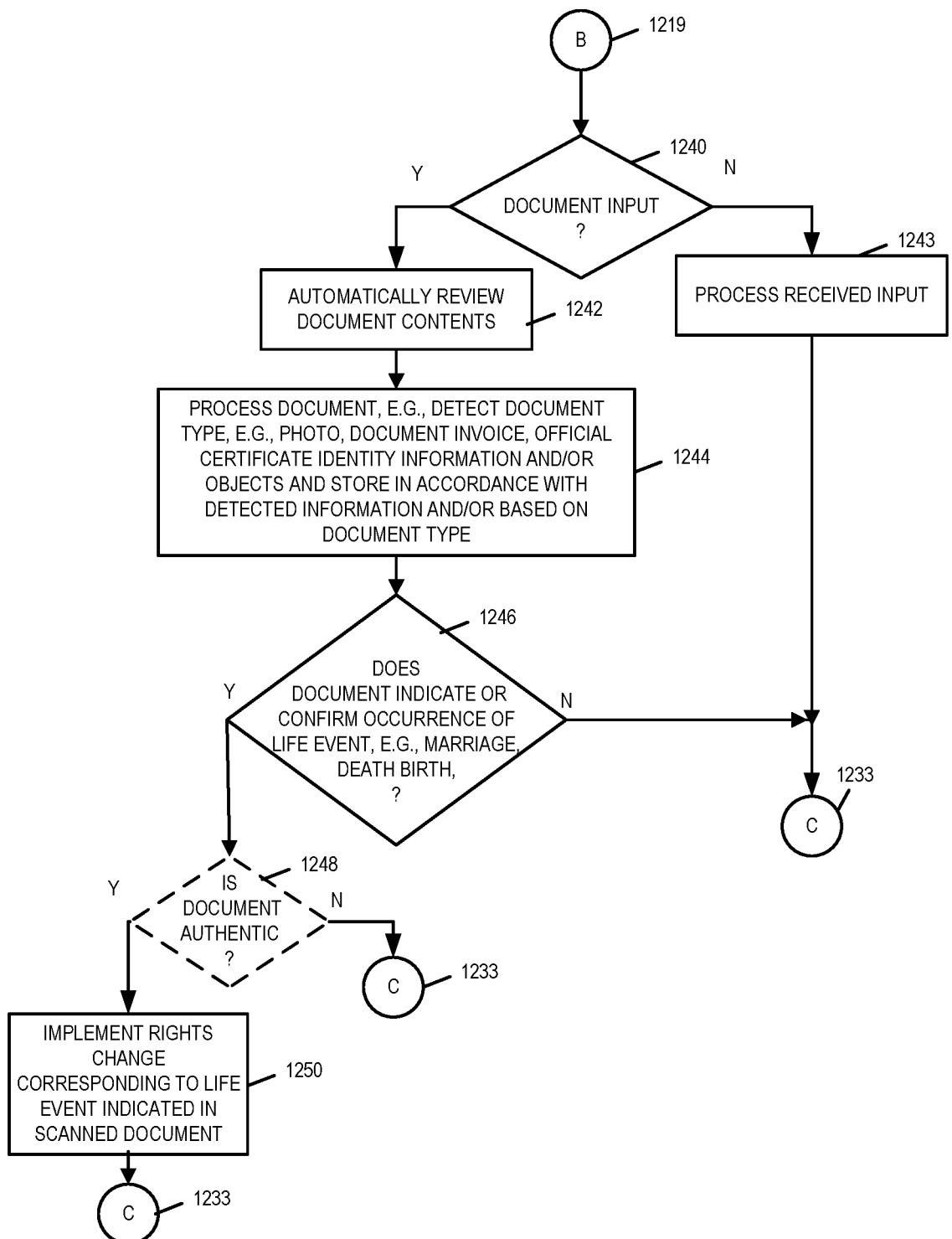
FIG. 11C is a third part of the flow chart of FIG. 11.
FIG. 11 shows how FIGS. 11A, 11B and 11C can be combined to form a flow chart showing steps relating to asset storage, ownership and/or access control which are used in various embodiments of the present invention to manage contents of a digital data store that may be and sometimes is a remote cloud based data store including family information.
Figure 11A:
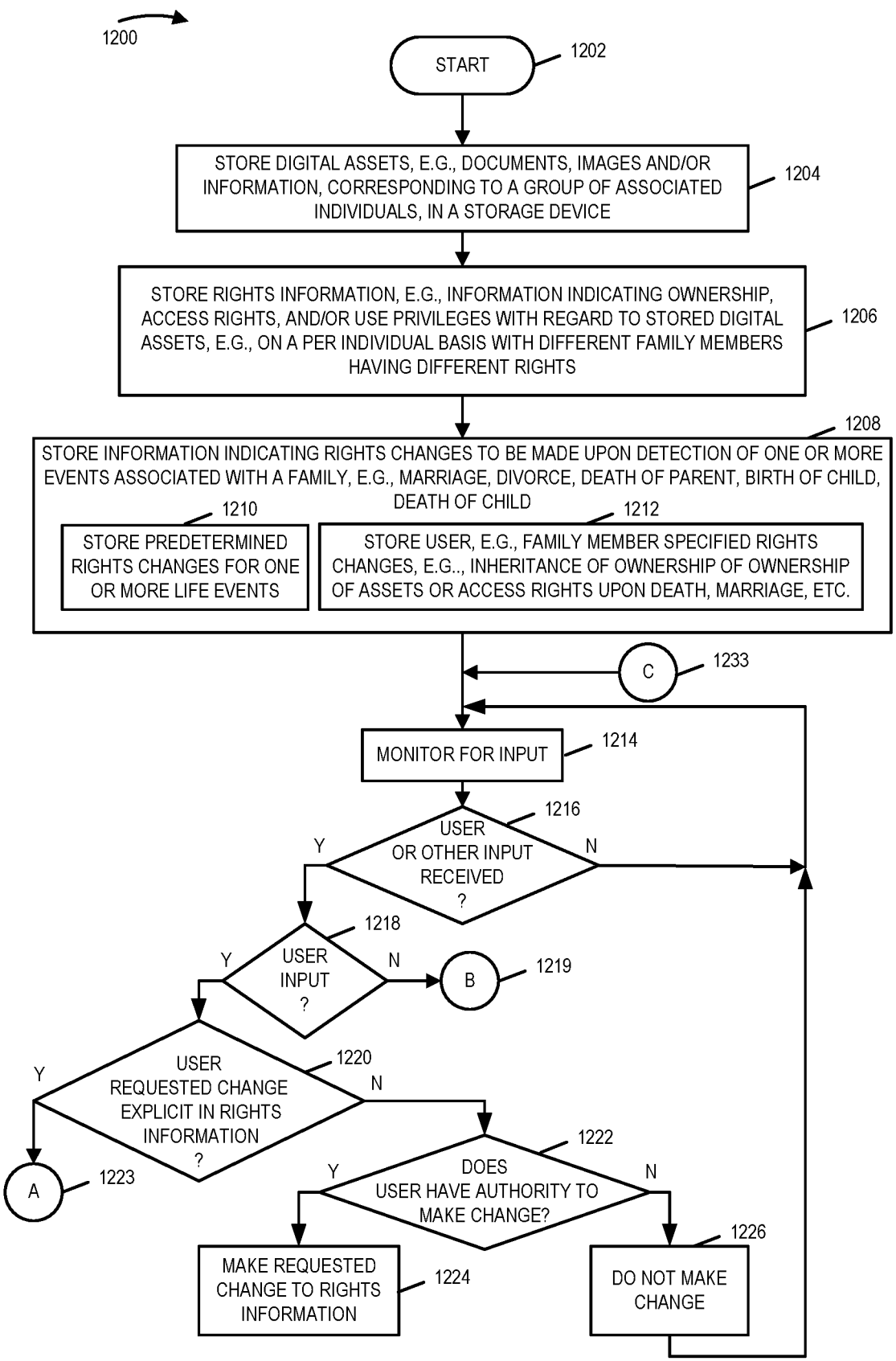
FIG. 11A is a first part of the flow chart of FIG. 11.
Figure 11B:
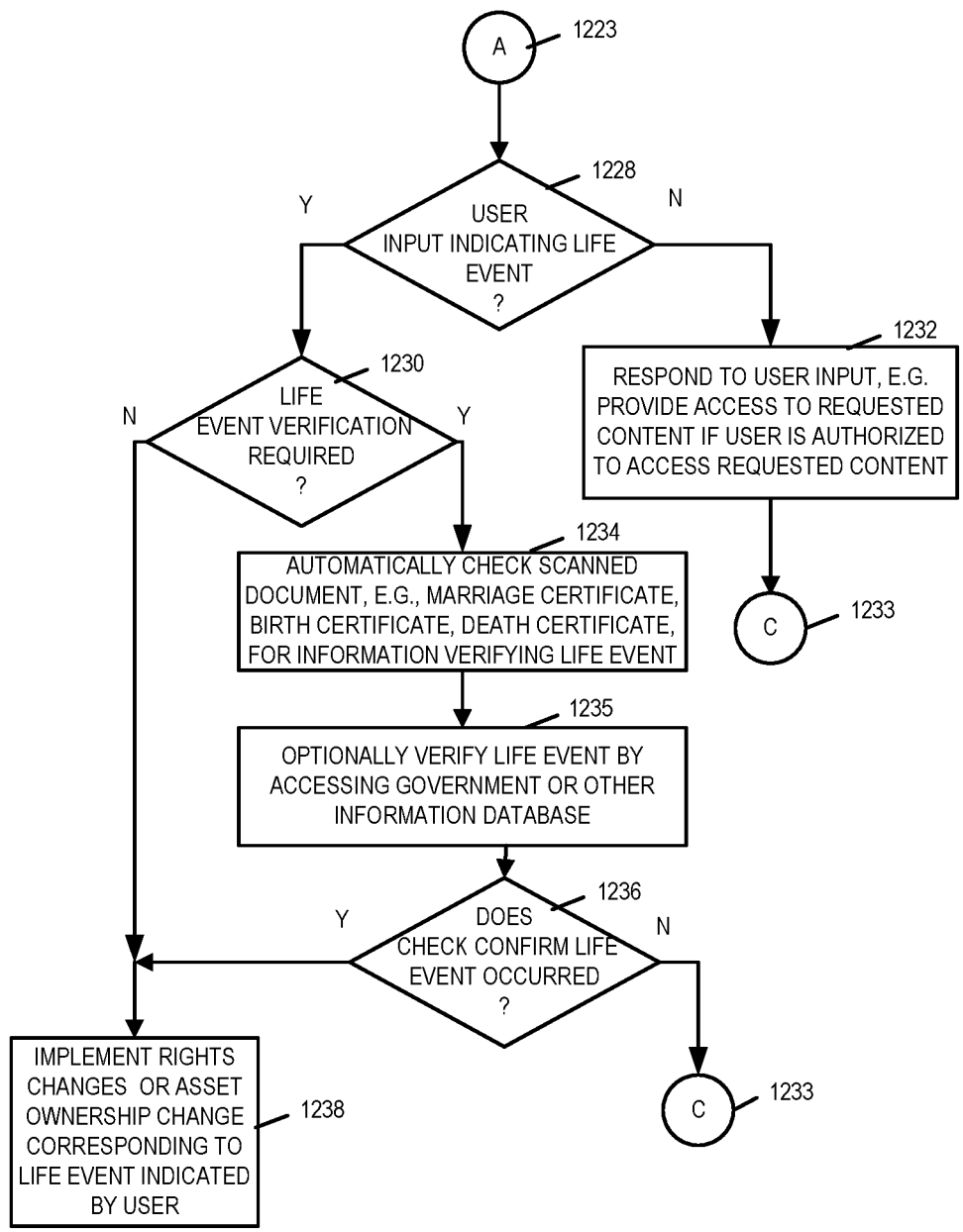
FIG. 11B is a second part of the flow chart of FIG. 11.

FIG. 11 shows how FIGS. 11A, 11B and 11C can be combined to form a flow chart showing steps relating to asset storage, ownership and/or access control which are used in various embodiments of the present invention to manage contents of a digital data store that may be, and sometimes is, a remote cloud based data store including family information.

While document scanning is normally done in a home using a scanner included in or attached to a device in the home, the access control and ownership decisions can be made by the processor of the home device or by the processor of the secure server depending on the particular embodiment.

Thus, depending on the particular embodiment one or more of the steps shown in FIG. 11 can be implemented by the home management appliance 472 or another home device and/or by components in the secure sever 402 which controls the secure server to operate in accordance with the invention.

FIG. 11, comprising the combination of FIG. 11A, FIG. 11B and FIG. 11C, is a flowchart 1200 of an exemplary method in accordance with an exemplary embodiment. Operation starts in step 1200 in which an exemplary system, e.g., a system including a secure server, a plurality of household management appliances, and one or more external system provider systems, is powered on and initialized. Operation proceeds from start step 1202 to step 1204.

In step 1204 digital assets, e.g. documents, images and/or information, corresponding to a group of associated individuals, are stored in a storage device. Operation proceeds from step 1204 to step 1206.

In step 1206 rights information, e.g., information indicating ownership, access rights, and/or use privileges with regard to stored digital assets, e.g., on a per individual basis with different family members having different rights, are stored. Operation proceeds from step 1206 to step 1208.

In step 1208 information indicating rights changes to be made based upon detection of one or more events associated with a family, e.g., marriage, divorce, death of parent, birth of child, death of child, e.g., are stored. Step 1208 includes steps 1210 and 1212. In step 1210 predetermined rights changes for one or more life events are stored. In step 1212 user, e.g., family member, specified rights changes, e.g. inheritance of ownership of assets or access rights upon death, marriage, etc., are stored. Operation proceeds from step 1208 to step 1214.

In step 1214 monitoring for input is performed. Operation proceeds from step 1214 to step 1216. In step 1216, if user or other input was received, then operation proceeds from step 1216 to step 1218. However, if no user or other input was received, then operation proceeds from step 1216 to the input of step 1214 for additional monitoring.

Returning to step 1218, in step 1218 if user input was received, then operation proceeds from step 1218 to step 1220; otherwise, operation proceeds from step 1218, via connecting node B 1219 to step 1240.

Returning to step 1220, in step 1220 if the user requested change is explicit in rights information, then operation proceeds from step 1220, via connecting node A 1223 to step 1228; however, if the user requested change is not explicit in rights information, then operation proceeds from step 1220 to step 1222.

In step 1222 a check is made as to whether or not the user has the authority to make the change. If the check of step 1222 determines that the user has the authority to make the requested change, then operation proceeds from step 1222 to step 1224, in which the requested change to the rights information is made. However, if the check of step 1220 determines that the user does not have the authority to make the requested change, then operation proceeds from step 1222 to step 1226, in which the request change is not made. Operation proceeds from step 1226 to the input of step 1214, in which additional monitoring for input is performed.

Returning to step 1228, in step 1228 a determination is made as to whether or not the received user input is indicating a life event. In step 1228 if the received user input is indicating a life event, then operation proceeds from step 1228 to step 1230; otherwise, operation proceeds from step 1228 to step 1232.

Returning to step 1230, in step 1230, a determination is made as to whether or not life event verification is required. If life event verification is required, then operation proceeds from step 1230 to step 1234; otherwise, operation proceeds from step 1230 to step 1238.

Returning to step 1234, in step 1234 a scanned document, e.g., a marriage certificate, birth certificate, death certificate, etc., is automatically checked for information verifying life event. Operation proceeds from step 1234 to step 1235 in which the life event is optionally verified by accessing a government or other information database. Operation proceeds from step 1235 to step 1236.

In step 1235 a determination is made as to whether or not the check confirmed that the life event occurred. If the determination is that the check confirmed the life event, then operation proceeds from step 1236 to step 1238; otherwise, operation proceeds from step 1236, via connecting node C 1233, to the input of step 1214 for additional monitoring.

Returning to step 1238, in step 1238 right changes or asset ownership changes corresponding to the life event indicated by the user are implemented.

Returning to step 1232, in step 1232 user input is responded to, e.g., access is provided to requested content if the user is authorized to access the requested content. Operation proceeds from step 1232, via connecting node C 1233, to the input of step 1214, for additional monitoring.

Returning to step 1240, in step 1240, it is determined if the other input which was received is document input. If the received input is document input, then operation proceeds from step 1240 to step 1242; otherwise, operation proceeds from step 1240 to step 1243, in which received input is processed. Operation proceeds from step 1243. via connecting node C 1233 to the input of step 1214 for additional monitoring.

Returning to step 1242, in step 1242 the document contents are automatically reviewed. Operation proceeds from step 1242 to step 1244.

In step 1244 the document is processed, e.g., the document type, e.g. photo, document invoice, etc., is detected, official certificate identity information, and/or objects are detected and stored in accordance with detected information and/or based on document type. Operation proceeds from step 1244 to step 1246.

In step 1246 it is determined if the document indicates or confirms occurrence of a lifer event, e.g., marriage, divorce, death, birth, etc. If the determination is that the document does not indicate or confirm occurrence of a life event, then operation proceeds from step 1246, via connecting node C 1233, to the input of step 1214 for additional monitoring. However, if the determination is that the document does indicate or confirm occurrence of a life event, then operation proceeds from step 1246, to optional step 1248 or to step 1250. In step 1248, a determination is made as to whether or mot the document is authentic. If the determination is that the document is not authentic, then, operation proceeds from step 1248, via connecting node C 1233 to the input of step 1214 for additional monitoring. However, if the determination is that the document is authentic, then, operation proceeds from step 1248, via connecting node C 1233 to step 1250. In step 1250 rights changes corresponding to the life event indicated in the scanned document are implemented. Operation proceeds from step 1250, via connecting node C 1233, to the input of step 1214 for additional monitoring.

Figure 12:
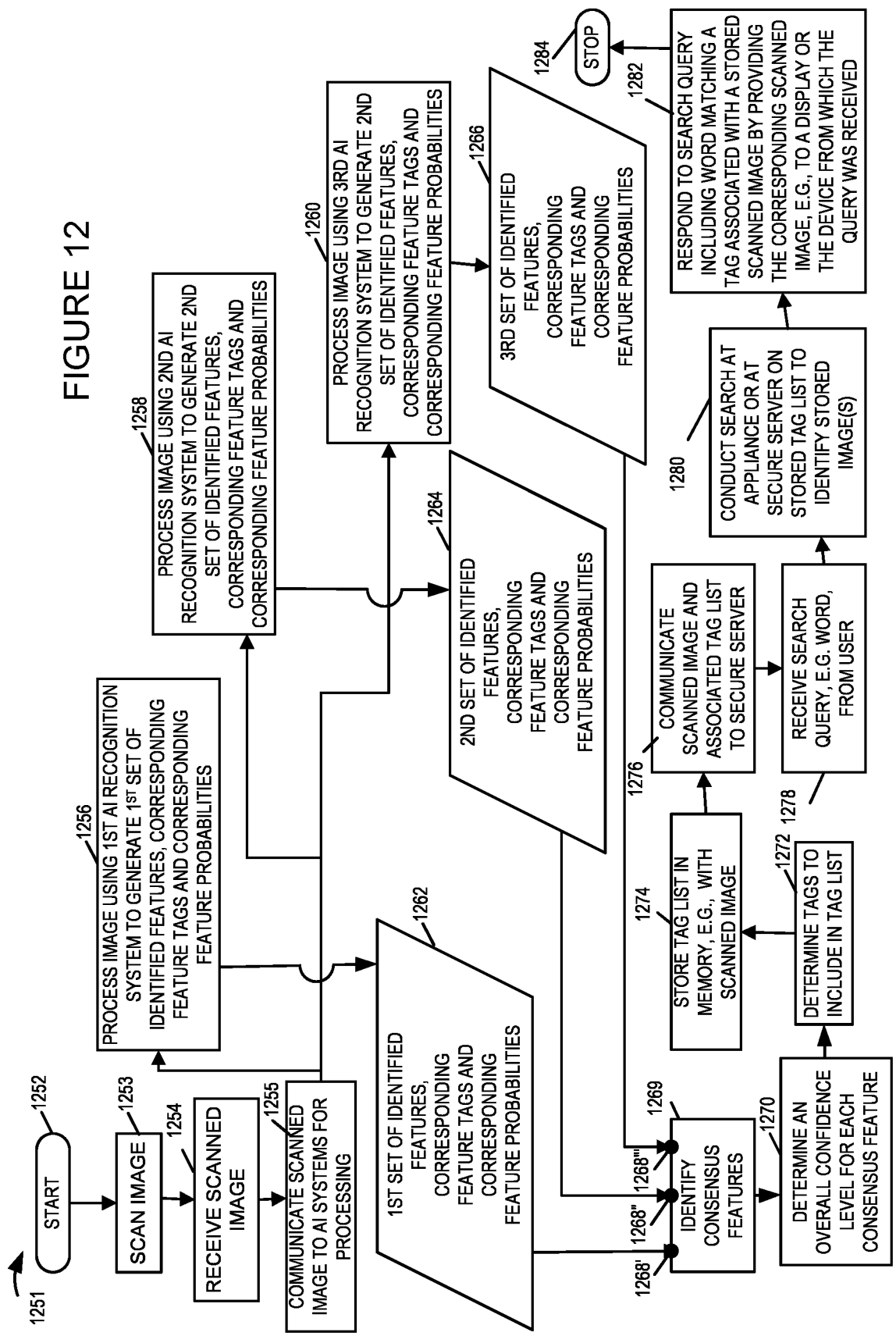
FIG. 12 shows the steps of a method of processing a physical image in the form of a photo or document to digitize the image and associate tags with the image for storage and to facilitate possible future word based image searching and image retrieval.

FIG. 12 shows the steps of a method of processing a physical image in the form of a photo or document to digitize the image and associate tags with the image for storage and to facilitate possible future word based image searching and image retrieval. The method shown in FIG. 12 may be, and sometimes is, implemented by an appliance such as one of the appliances 108, 111, 200, 300 shown in FIGS. 1, 2 and 3 which can interact with the artificial intelligence systems 97, 98 and/or 99 to provide them scanned images and receive there from reports relating to features recognized in the scanned images. Individual reports received from the AI systems can, and sometimes do, provide a list of features recognized by the system to be in the image and, for each detected feature a list of one or more tags and a confidence level indicating the probability that the feature is in the scanned image which was processed. As will be discussed below, this information can be, and sometimes is, used to determine which tags are associated with an image as part of an automated process that may potentially involve some user input in terms of an operator viewing the scanned document confirming that one or more features are present and/or confirming a tag or synonym of a tag that should be associated with a scanned image that is being stored. Tags may be, and sometimes are, individual words but can also be phrases.

The method 1251 shown in FIG. 12 starts in start step 1252 with a home appliance being powered on and the processor beginning to implement a routine which controls the home appliance 108, 111, 300, 500 or 600 to implement the method shown in FIG. 12. Operation proceeds from step 1252 to scan step 1253 where an image, e.g., a document or photograph, is scanned, e.g., using scanner 318 which may be integrated into the home appliance or attached to the home appliance.

Operation proceeds from scan step 1253 to step 1254 wherein the processor 306 and/or memory 302 of the home appliance, e.g., exemplary appliance 300 receive the scanned image and then communicate it via the interface 304 and/or communications network 104 to the AI systems 97, 98, 99.

The AI systems 97, 98, 99 receive and process the scanned image in steps 1256, 1258, 1260, respectively. The first AI system 97 returns a first set of information 1262 including a list of identified features, a tag or tags for each individual identified feature and a corresponding confidence level that the individual feature is present in the scanned image. The second AI system 98 returns a second set of information 1264 including a list of identified features, a tag or tags for each individual identified feature and a corresponding confidence level that the individual feature is present in the scanned image. The third AI system 99 returns a third set of information 1266 including a list of identified features, a tag or tags for each individual identified feature and a corresponding confidence level that the individual feature is present in the scanned image. Since the different AI systems 97, 98, 99 run different feature recognition algorithms the results provided by the three systems 97, 98, 99 may be different with some of the systems recognizing one or more features which were not recognized by one of the other AI systems 97, 98 or 99.

The results 1262, 1264, 1266 of scanned image analysis are returned from the AI systems 97, 98, 99 to the appliance 108. Steps 1268', 1268", 1268''' represent the home appliance 108 receiving the feature detection results from the AI systems 97, 98, 99 respectively. In some embodiments the results from each AI system are provided in list form for a processed image. The list returned by the AI system includes a list of features which were identified and for each identified feature a detection probability also sometimes referred to as a confidence measure or value and one or more tags corresponding to the identified feature. For example if AI system 1 97 identifies a dog as a first detected feature in a first image that was received form the home appliance it would include in a list that a dog feature was detected, a probability that the dog feature was accurately detected, e.g., a value 0.9 indicating a 90% certainty that the dog feature was present, and one or more tags corresponding to the dog feature such as the word "dog" and/or other terms such as "German Sheppard" or other names for one or more breads of dogs. The list returned by the AI system 97 and received in step 1268' may include other features, a corresponding confidence value for each individual feature and one or more tags for each identified feature.

In step 1269 the home appliance identifies consensus features, e.g., one or more features which were individually identified by more than one of the various AI systems 97, 98, 99, e.g., features that the AI systems agree are present in the scanned image. Consensus of the AI systems may be, and sometimes is, evidenced by multiple AI systems identifying the same feature, e.g., a "dog feature". In step 1269 the features in the results 1262, 1264 and 1266 are compared and features which were identified by each of the AI systems are identified as consensus features when multiple AI systems agree that these features are present. For each identified consensus feature the corresponding confidence level provided by each AI system and tags are supplied to step 1270. In step 1270 an overall confidence level is determined, e.g., by the home appliance 108, for each individual consensus feature based on the probabilities returned by each of the multiple AI systems 97, 98, 99 that detected the feature in the scanned image being processed.

Figure 13:
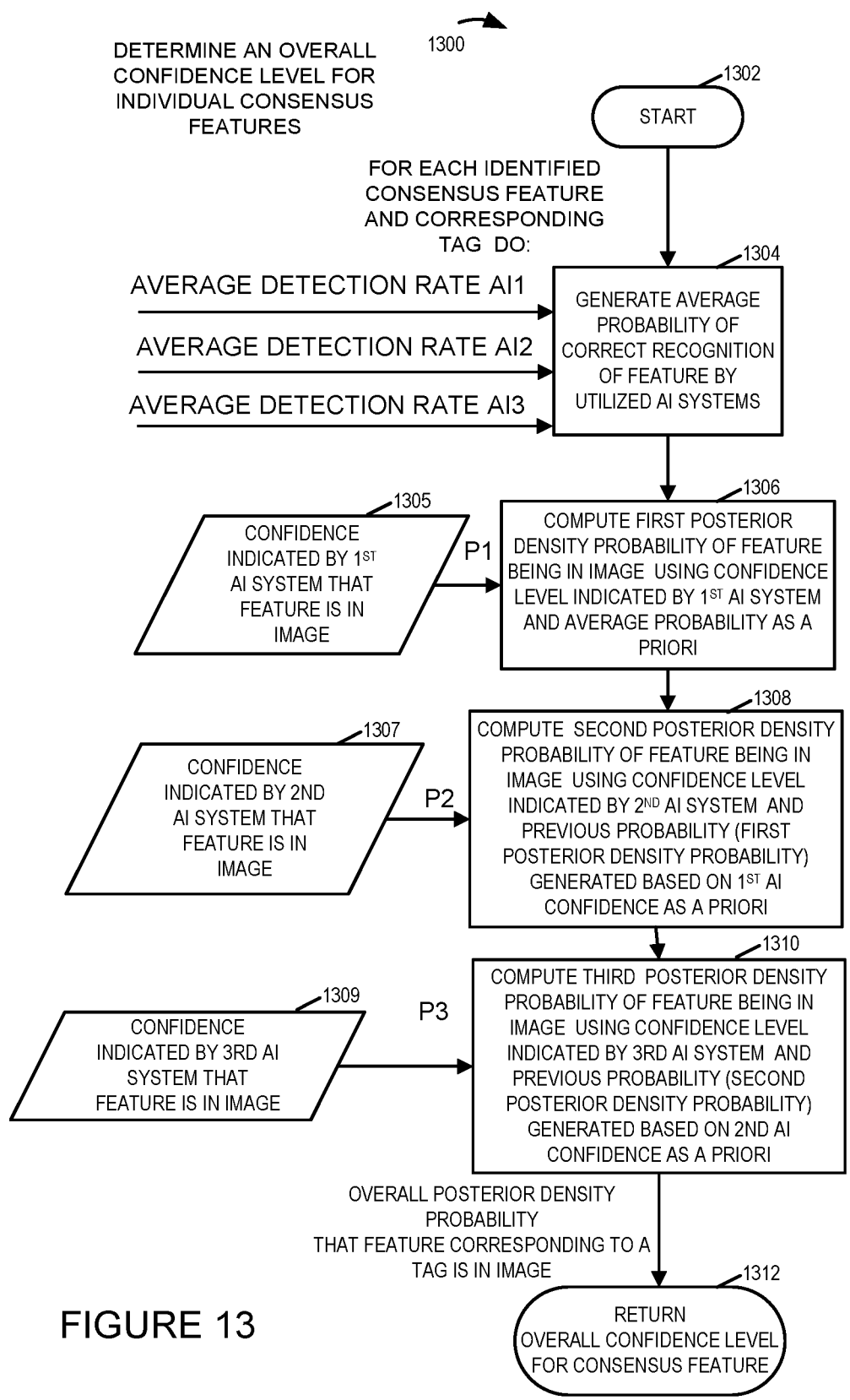
FIG. 13 shows the steps of a method of using information from multiple artificial intelligence systems to identify one or more features in a scanned image and determine an overall confidence level for one or more individual features based on information provided by multiple artificial intelligence systems to which Bayesian inference analysis is applied.

Step 1270 may be, and sometimes is, implemented by the processor of the appliance making a call to an overall confidence level determination subroutine such as the one shown in FIG. 13 to which the consensus feature information is supplied for processing.

In other embodiments the overall confidence level for a particular consensus feature may be, and sometimes is, generated by forming a simple average or a weighted average of the probability, e.g., confidence, values returned by the systems which detected the particular feature.

The method 1300 of determining an overall confidence level for a consensus feature will now be discussed with reference to FIG. 13. The method 1300 starts in step 1302 when the routine is called, e.g., by the method 1251 shown in FIG. 12. Each consensus feature is processed independently with the process proceeding from step 1302 to step 1304 for each identified consensus feature. Thus, the processing shown in steps 1304 to 1312 will be performed for each consensus feature.

In step 1304 the average feature detection rates for each of the AI systems AI 1 97, AI 2 98 and AI 3 99 which detected the consensus feature and returned results are taken into consideration and averaged to generate an average detection rate that serves as a prior input to step 1306 as part of a Bayesian inference process. The average feature detection rates are, in some embodiments, rates based on past testing and not based on the processing of the scanned image. Such rates are considered prior knowledge that can be used as an input to a Bayesian process, where the probability is updated based on the confidence level reported by one or more AI systems that the consensus feature to which the processing in steps 1304 to 1310 relates was actually detected.

In step 1306 a first posterior density probability is generated from the average probability supplied by step 1304 and the confidence 1305 indicated by the first AI system 97 that the feature to which the processing relates was detected by the first AI system 97 in the scanned image.

The first posterior density probability generated in step 1306 is supplied as a priori to step 1308 which also receives the probability that the consensus feature was detected by the second AI system 98. In step 1308 a second posterior density probability is generated from the first posterior density probability supplied by step 1306 and the confidence 1307 indicated by the second AI system 98 that the feature to which the processing relates was detected by the second AI system 98 in the scanned image.

The second posterior density probability generated in step 1308 is then supplied as a priori to step 1310 which also receives the probability that the consensus feature was detected by AI system 99. In step 1310 a third posterior density probability is generated from the second posterior density probability supplied by step 1308 and the confidence 1309 indicated by the third AI system 99 that the feature to which the processing relates was detected by the third AI system 99 in the scanned image.

The third posterior density probability generated in step 1310 takes into consideration the probabilities indicated by each of the 3 AI systems (97, 98, 99) that the feature to which the processing relates is in the scanned image is an overall posterior density probability and is considered an overall confidence level for the consensus feature. The overall confidence level for the consensus feature to which the processing relates is returned to the processor which called the subroutine 1300 in step 1312 and can be used, as discussed below to make a decision as to which tag or tags should be associated with an image.

Since steps 1304 to step 1312 are performed for each consensus feature that was detected, at the end of the processing shown in FIG. 13, the apparatus implementing the method will have an overall confidence level for each consensus feature being processed and operation will return to the point from which method 1300 was called.

Referring once again to FIG. 12, at the end of step 1270, the apparatus, e.g., home appliance 108, will have an overall confidence level, e.g., probability, for each individual consensus feature that was identified in step 1269. Operation proceeds from step 1270 to step 1272, in which one or more tags are determined to include in a tag list to be associated with the scanned image. The tag list, in some embodiments, includes at least one tag for each consensus feature having a high level of certainty of being present in the scanned image as evidenced by either: i) having an overall confidence level over a threshold value, e.g., a value which may be a preset value and/or ii) confirmed by a system operator to be present in the scanned image.

In some embodiments whether to include a tag in a tag list corresponding to an image is implemented based on a simple threshold basis with the tag being included in the tag list being created when the overall confidence value corresponding to the feature with which the tag is associated exceeds a threshold level, e.g., a predetermined threshold level. In cases where the overall confidence value exceeds the threshold level the tag and corresponding feature are included in the tag list that is associated with the scanned image. However, if the overall confidence value associated with a feature and tag or tags is at or below the threshold, in some embodiments the feature and/or corresponding tags are not included in the tag list for the scanned image.

Figure 14:
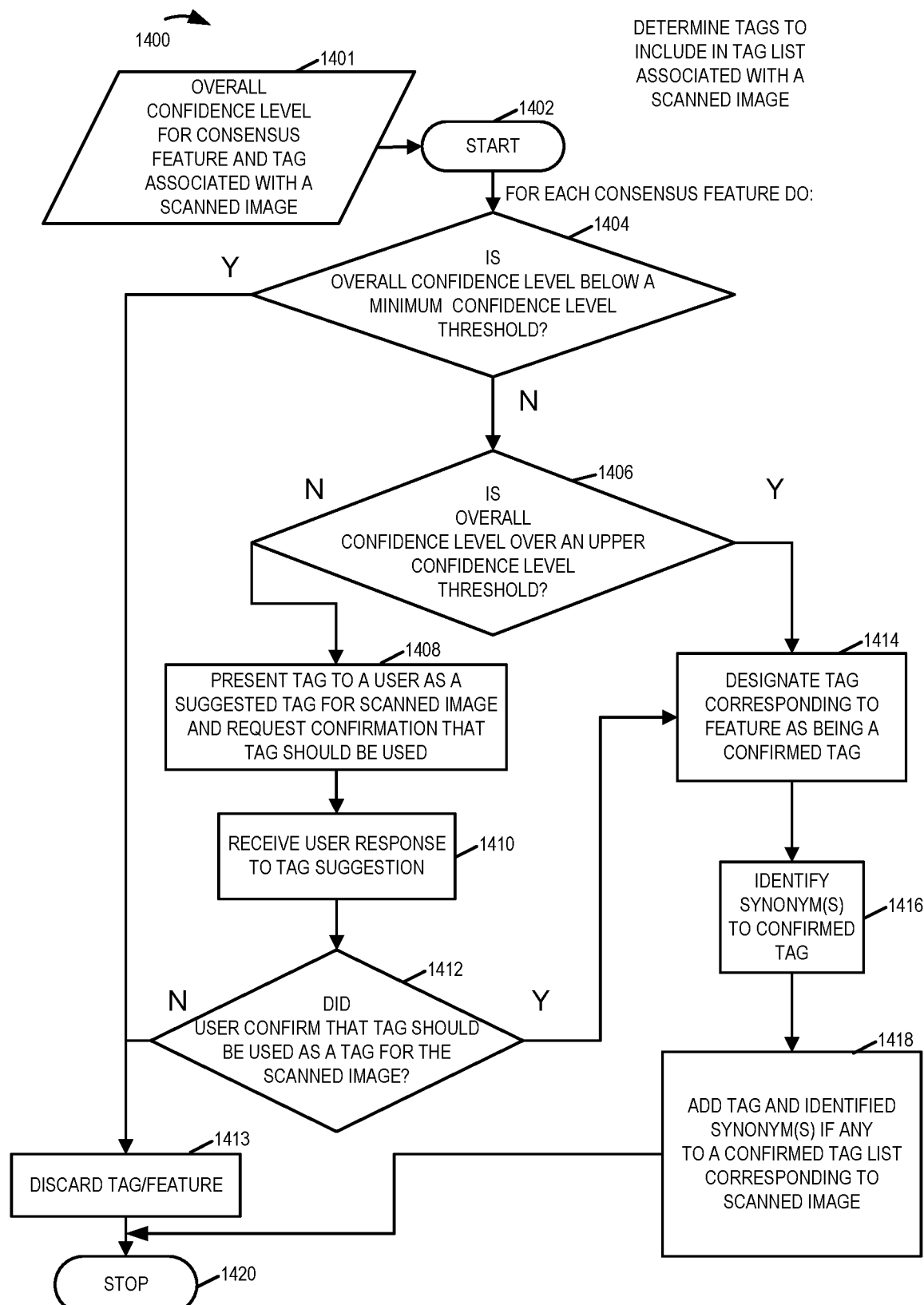
FIG. 14 shows the steps of a method of determine whether a tag or tags should be associated with an image based on results of one or more artificial intelligence feature recognition operations and/or operator input.

More complicated approaches to deciding whether to include a tag in a tag list can be used with, in some embodiments limited user input being used to facilitate the tag association processes. FIG. 14 shows one approach to implementing step 1272 which can involve some user input depending on the embodiment and/or overall confidence level associated with a tag and corresponding identified consensus feature. Accordingly, to facilitate an understanding of invention, FIG. 14 will now be discussed.

The method 1400 shown in FIG. 14, starts in step 1402 in response to a call, e.g., from routine 1251, and with the information 1401 including the overall confidence level information for features and the corresponding tags being supplied to the routine 1400. Steps 1404 to 1418 are performed for each individual consensus feature to determine if the tag or tags corresponding to the feature should be associated with the scanned image.

In step 1404 a determination is made as to whether the overall confidence level corresponding to the feature is below a minimum confidence level threshold, e.g., a threshold indicating that the probability of the feature being present is sufficiently low that the feature should not be associated with the image and thus the tags corresponding to the feature should not be associated with the image. In step 1404 if the overall confidence level of the feature is below the minimum confidence level threshold operation proceeds from step 1404 to discard tag/feature step 1413. In step 1413 the tag or tags corresponding to the feature are discarded and the feature and tags will not be associated with the scanned image, e.g., due to the low level of confidence that the feature is in the scanned image. Operation proceeds from step 1413 to step 1420 where processing regarding the individual feature is halted. While the processing of the individual feature in subroutine 1400 stops in step 1420 processing returns to the main routine and continues in routine 1251 which called subroutine 1400.

In step 1404 if the decision was that the overall confidence level of the feature was not below the minimum confidence level threshold operation will proceed to step 1406. In step 1406 the overall confidence level is compared to an upper confidence level threshold to determine if it is over the upper confidence level threshold indicating that the feature is highly likely to be in the scanned image. If in step 1406 the overall confidence level of the feature is determined to be over the upper confidence level threshold operation proceeds to step 1414 in which a decision is made to include a tag or tags corresponding to the feature in information being associated with the scanned image as indicated by a decision to designate the tag or tags associated with the feature as confirmed tags, e.g., tags which correspond to a feature confirmed to be in the scanned image and thus which should be associated with the image.

In step 1406 if it was determined that the overall confidence level of the feature did not exceed the upper confidence level threshold, operation proceeds from step 1406 to step 1408 in which an attempt is made to obtain input from a user as to whether or not the feature is present in the scanned image. In step 1408 the tag, e.g., word, identifying the feature, is presented to an operator of the appliance as a suggested tag for the scanned image and the operator, is requested to confirm that the tag should be used with the scanned image. The scanned image may be, and sometimes is, presented to the operator with the tag on a display, e.g., display 204 or display 308, at the time the operator of the apparatus is requested to confirm that the tag should be associated with the scanned image.

In step 1410 a user response is received indicating whether the suggested tag should be used, e.g., associated with the scanned image, or not used. If the operator, e.g., person who scanned the image, indicates that the tag should not be used, operation proceeds from step 1412 to discard tag/feature step 1413, and the tag and feature will not be associated with the scanned image. Since the tag corresponds to the feature confirmation of a tag by an operator also servers as human confirmation that the corresponding feature to which the tag relates is in the scanned image.

However, if in step 1412 the user confirms that the tag should be used, e.g., associated with the scanned image because the feature indicated by the tag is in the scanned image, operation proceeds from step 1412 to step 1414.

In step 1414 the tag that was confirmed by the operator is designated as a confirmed tag and operation proceeds from step 1414 to step 1416. In step 1416 a synonym or synonyms corresponding to the confirmed tag are identified, e.g., via a look up of synonyms in a synonym listing stored in memory. While synonyms may be available for some words they may not be available for all words. Accordingly, in step 1416 synonyms will be identified when they exist which will be in the case of many tags. Operation proceeds from step 1416 to step 1418 where the tag or tags, e.g., words, identifying a confirmed feature are added to a confirmed tag list corresponding to the scanned image. In this way the confirmed tag corresponding to a detected feature is associated in memory with the scanned image. Operation proceeds from step 1418 to step 1420 which represents the stopping point of processing performed in method 1400 corresponding to an individual consensus feature. While in some embodiments synonyms are added automatically for confirmed tags, in other embodiments the operator is requested to review the identified synonyms and confirm they should be associated with the scanned image prior to the individual synonyms being associated with the scanned image.

As tags corresponding to different consensus features are processed in the method 1400, tags corresponding to different consensus features are added to the confirmed tag list associated with a scanned image, multiple detected features are automatically associated with the scanned image in a reliable manner.

With the completion of the processing of consensus features in FIG. 14 and the tags to be associated with the scanned image having been determined, operation returns to step 1272 shown in FIG. 12 and then proceeds to step 1274 in which the confirmed tag list associated with the scanned image is stored in memory, e.g. with the scanned image. The tag list may include simply the confirmed tags associated with the scanned images but may, and sometimes also does, include one or more confirmed features to which one or more listed tags correspond. The tag list and scanned image may be, and in some embodiments is, communicated in step 1276 by the apparatus 300, e.g., home appliance 108, to the secure server 102 for storage. The tag list and scanned image may be, and sometimes is, also maintained in the memory of the apparatus 300. Thus depending on the embodiment the secure server and/or home appliance may store scanned images and corresponding tag lists that can be used to respond to user word queries seeking images based on the input of a word or words which may be stored in a tag list corresponding to a stored image.

With the tag lists and corresponding scanned images having been stored in the secure server (102) and home appliance (108 or 300), a user can enter one or more words in a query and obtain, as part of a query result, one or more corresponding stored images. In at least some embodiments an image is determined to correspond to a query if a word entered as part of the query is included in the tag list associated with a stored image. For example, a query including the work "dog" would return a query result which includes the first image which was found to include a dog image as a feature and for which the tag "dog" was stored in memory in the tag list corresponding to the image including the dog feature.

Step 1278 relates to the use of the stored set of scanned images and associated tags to respond to a user query, which in some embodiments is entered using the keyboard of the home appliance 300 or 108. In step 1278 a search query is received. As noted above the search query may be, and sometimes is, a word. Following receipt of the search query in step 1280, a search is conducted using the word received in the query as a search term. The search is conducted by the home appliance either using the stored tag lists included in its memory or by communicating the word to be use in the search to the secure server which includes the tag lists and images. Thus, depending on the embodiment the search performed in 1280 can be conducted at the home appliance 300, 108 or at the secure server 102. As part of conducting the search, the word in the query is compared to tags in the stored tag lists and stored scanned images having a tag matching the word being searched are returned in response to the query. In step 1282 the home appliance and/or secure server which implemented the search responds by providing the user the scanned image or images having a tag corresponding to the searched word or words. The home appliance displays in step 1282 the image or images returned as search results thereby providing the user of the appliance 300 or 108 a response to the query.

Having responded to a query, operation is shown as stopping in step 1284, but it should be appreciated that the steps of FIG. 12 can be used to process additional images and/or queries on an as needed basis in response to a user scanning images using the home appliance 300 or 108 or entering an image search query into the home appliance 300 or 108.

In step 1282 a device, e.g., the secure server 102 or appliance 300, receiving a search query response to the search query including a word matching a tag associated with the scanned image by providing the scanned image, e.g., to a display or device which is used to present the scanned image to the person who entered the query. As should be appreciated when the person who entered the query is the operator of the appliance, the appliance 300 or secure server 102 will respond to the query by providing the scanned image having an associated tag matching the search term and causing the image to be displayed on a display to the operator who entered the query.

The method stops in steps 1284 with the system, appliance or devices being used to implement the method 1251 being powered down.

In view of the above, it should be appreciated that the appliance of the present invention offers numerous advantages over personal computer based systems and/or dedicated health care or photo scanning systems.

Figure 15:
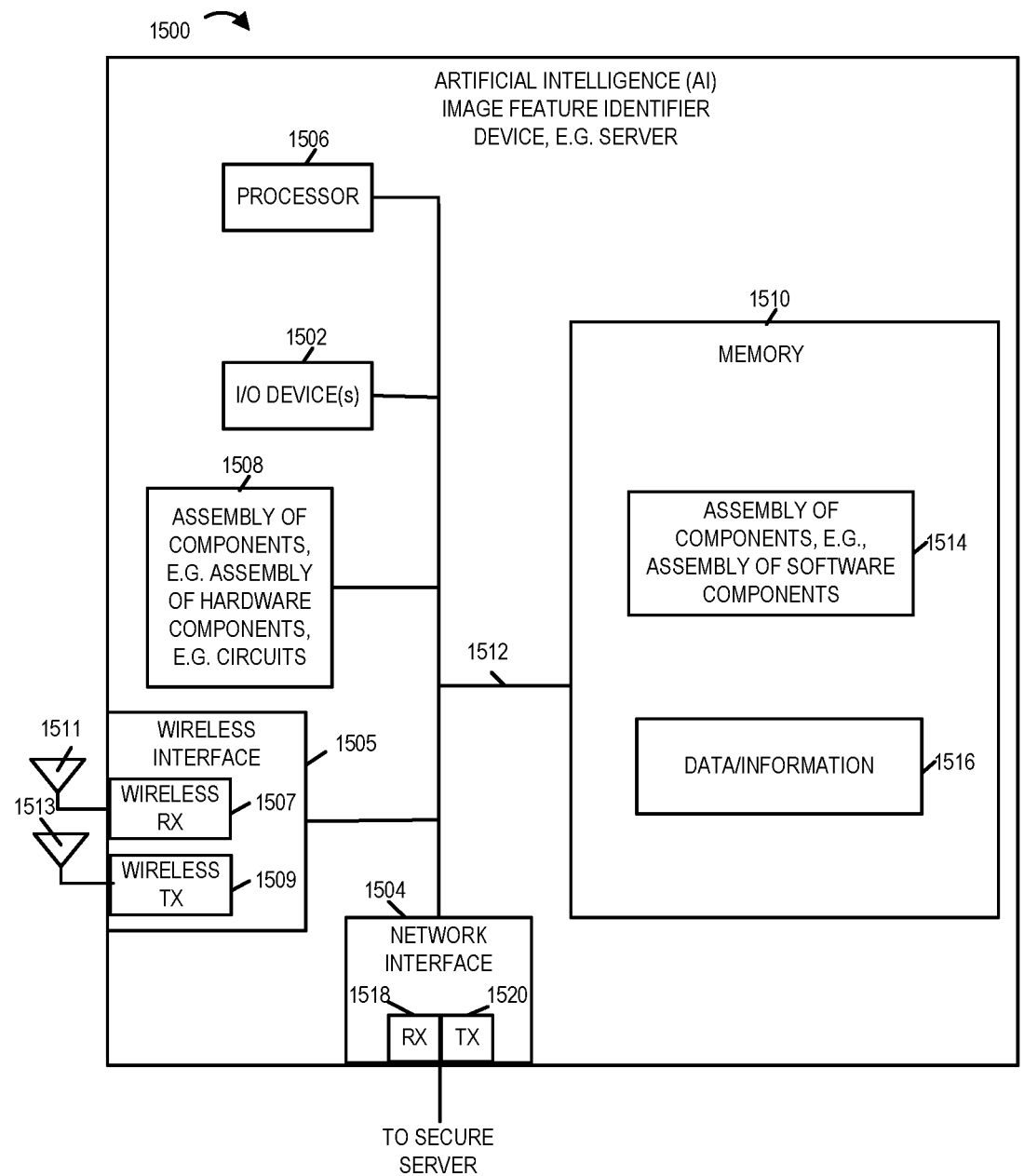
FIG. 15 illustrate an exemplary artificial intelligence (AI) image feature identifier device, e.g. server, in accordance with an exemplary embodiment.

FIG. 15 illustrate an exemplary artificial intelligence (AI) image feature identifier device 1500, e.g., server, in accordance with an exemplary embodiment. Exemplary AI image feature identifier device 1500 is, e.g., any of the AI image feature identifiers (AI-1 image feature identifier 97, AI-2 image feature identifier 98, AI-3 image feature identifier 99) of system 100 of FIG. 1.

Exemplary AI image feature identifier 1500 includes I/O device(s) 1502, e.g., a keyboard and a display, a network interface 1504, a wireless interface 1505, a processor 1506, e.g., a CPU, an assembly of components 1508, e.g., an assembly of hardware components, e.g., circuits, a memory 1510 coupled together via a bus 1512 over which the various elements may interchange data and information. Memory 1510 includes an assembly of components 1514, e.g., an assembly of software components, e.g., software routines, software subroutines, software modules and/or apps, and data/information 1516.

Network interface 1504 includes a receiver 1518 and a transmitter 1520. Network interface 1504 may, and sometimes does, couple the AI image feature identifier device 1500 to a secure server, the Internet, communications networks, and/or other network nodes, e.g., a household management device at a customer premises. Wireless interface 1505 includes a wireless receiver 1507 coupled to receive antenna 1511 and a wireless transmitter 1509 coupled to transmit antenna 1513. Wireless interface 1505 may, and sometimes does, couple the AI image feature identifier device 1500 to a secure server, the Internet, communications networks, and/or other network nodes, e.g., a household management device at a customer premises.

Figures 16, 16B:
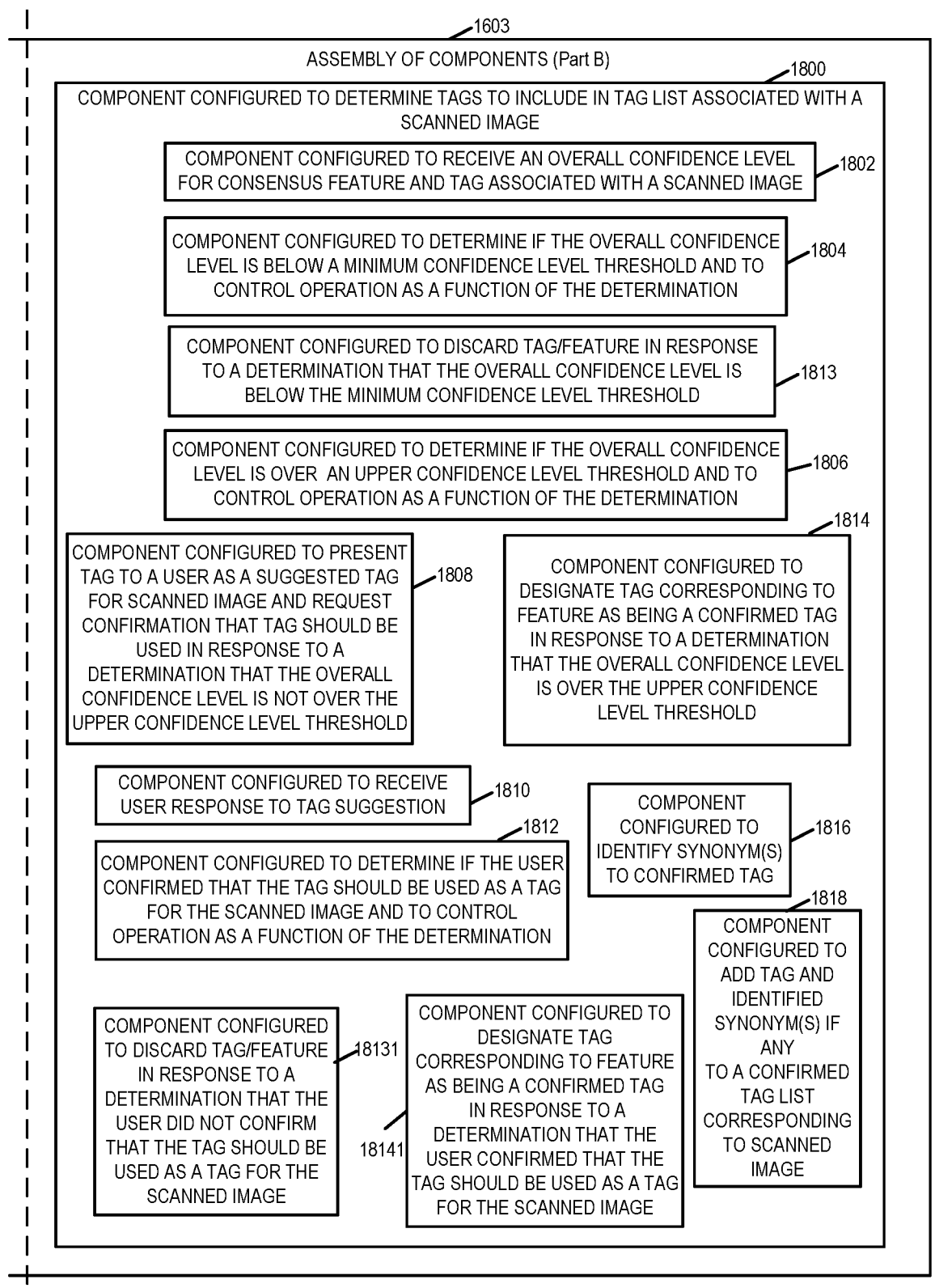
FIG. 16B is a second part of an exemplary assembly of components which may be included in a device in accordance with an exemplary embodiment.
FIG. 16 comprises the combination of FIG. 16A and FIG. 16B.
Figure 16A:
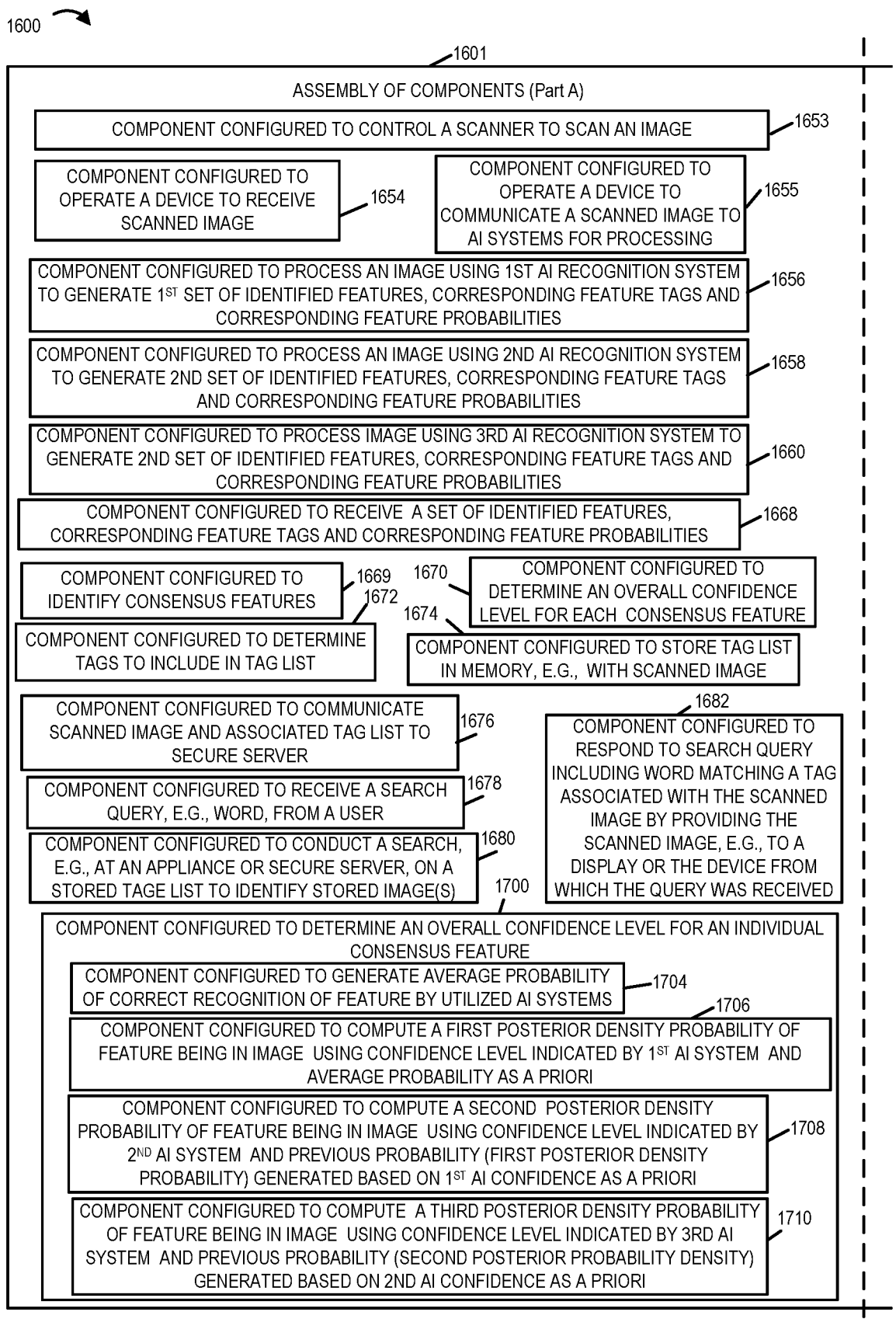
FIG. 16A is a first part of an exemplary assembly of components which may be included in a device in accordance with an exemplary embodiment.

FIG. 16, comprising the combination of FIG. 16A and FIG. 16B, is a drawing of an exemplary assembly of components 1600, comprising the combination of Part A 1601 and Part B 1603, which may be included in a device or combination of devices, e.g., secure server, a household appliance, and/or one or more artificial intelligence image feature identifier device(s), in accordance with an exemplary embodiment.

FIG. 16 is a drawing of an assembly of components 1600, which may be included in a device(s), e.g., an appliance in a home and/or in a secure server and/or in artificial intelligence image feature identifier device(s), in accordance with an exemplary embodiment.

In some embodiments, a device including one or more or all of the components in assembly of components 1600 is an appliance in a home, for example, the appliance is one of appliance 108 or 111 or FIG. 1, appliance 200 of FIG. 2, appliance 300 of FIG. 3, appliance 472 of FIG. 4, appliance 500 of FIG. 5, and/or appliance 600 of FIG. 6. In embodiments, the device includes or is coupled to one or more AI feature identifier(s).

In some embodiments, a device including one or more or all of the components in assembly of components 1600 is a secure server, e.g., secure server 102, secure server 402 or secure server 900, which receives user and document input from a home management appliance or one or more other devices, e.g., device 470, which include or are coupled to a scanner, e.g. scanner 510. In some embodiments, the secure server 102 includes or is coupled to one or more AI feature identifier(s).

In some embodiments, a device including some of the components in assembly of components 1600 is an artificial intelligence (AI) feature identifier device, e.g., any of AI features Identifiers 97, 98, 99 of FIG. 1 or AI feature identifier device 1500 of FIG. 15.

The components in the assembly of components 1600 can, and in some embodiments are, implemented fully in hardware within a processor, e.g., processor 306 or 906 or 1506, e.g., as individual circuits. The components in the assembly of components 1600 can, and in some embodiments are, implemented fully in hardware within the assembly of hardware components 352 or 908 or 1508, e.g., as individual circuits corresponding to the different components. In other embodiments some of the components are implemented, e.g., as circuits, within processor 306 or 906 or 1506 with other components being implemented, e.g., as circuits within assembly of components 352 or 908 or 1508, external to and coupled to the processor 306 or 906 or 1506. As should be appreciated the level of integration of components on the processor and/or with some components being external to the processor may be one of design choice. Alternatively, rather than being implemented as circuits, all or some of the components may be implemented in software and stored in the memory 302 or 912 or 1510 of the device 300 or 900 or 1500, with the components controlling operation of device 300 or 900 or 1500 to implement the functions corresponding to the components when the components are executed by a processor e.g., processor 306 or 906 or 1506. In some such embodiments, the assembly of components 1600 is included in the memory 302 or 912 or 1510 as part of assembly of software components 354 or 913 or 1514. In still other embodiments, various components in assembly of components 1600 are implemented as a combination of hardware and software, e.g., with another circuit external to the processor providing input to the processor which then under software control operates to perform a portion of a component's function.

When implemented in software the components include code, which when executed by a processor, e.g., processor 306 or 906 or 1506, configure the processor to implement the function corresponding to the component. In embodiments where the assembly of components 1600 is stored in the memory 302 or 912 or 1510, the memory 302 or 912 or 1510 is a computer program product comprising a computer readable medium comprising code, e.g., individual code for each component, for causing at least one computer, e.g., processor 306 or 906 or 1506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 16 control and/or configure the device 300 or 900 or 1500 or elements therein such as the processor 306 or 906 or 1506, to perform the functions of corresponding steps illustrated and/or described in the method of one or more of the flowcharts, signaling diagrams and/or described with respect to any of the Figures. Thus the assembly of components 1600 includes various components that perform functions of corresponding one or more described and/or illustrated steps of an exemplary method, e.g., the method of flowchart 1251 of FIG. 12, the flowchart 1300 of FIG. 13 and the flowchart 1400 of FIG. 14.

Assembly of components 1600 includes a component 1653 configured to control a scanner to scan an image, a component 1654 configured to operate a device to receive a scanned image, a component 1655 configured to operate a device to communicate a scanned image to AI systems for processing, a component 1656 configured to process an image using a 1st. AI recognition system to generate a 1st set of identified features, corresponding feature tags and corresponding feature probabilities, a component 1658 configured to process an image using a 2nd AI recognition system to generate a 2nd set of identified features, corresponding feature tags and corresponding feature probabilities, and a component 1660 configured to process an image using a 3nd AI recognition system to generate a 3rd set of identified features, corresponding feature tags and corresponding feature probabilities.

Assembly of components 1600 further includes a component 1668 configured to receive a set of identified features (e.g., 1st set of identified features from 1st AI, 2nd set of identified features from second AI, or 3rd set of identified features from 3rd AI), corresponding feature tags and corresponding feature probabilities, a component 1669 configured to identify consensus features, a component 1670 configured to determine an overall confidence level for each consensus feature, a component 1672 configured to determine tags to include in a tag list, a component 1674 configured to store the tag list in memory, e.g., with a scanned image, a component 1676 configured to communicate a scanned image and associated tag list to a secure server, a component 1678 configured to receive search query, e.g., word, from a user, a component 1680 configured to conduct a search, e.g., at the appliance or secure server, on a stored tag list to identify stored image(s), and a component 1682 configured to respond to a search query including a word matching a tag associated with a scanned image by providing the scanned image, e.g., to a display or the device from which the query was received.

Assembly of components 1600 further includes a component 1700 configured to determine an overall confidence level for an individual consensus feature. Component 1700 includes a component 1704 configured to generate an average probability of correct recognition of a feature by utilized AI systems, a component 1706 configured to compute a first posterior density probability of a feature being in an image using confidence level indicated by a 1st AI system and an average probability as a priori, a component 1708 configured to compute a second posterior density probability of a feature being in an image using confidence level indicated by a 2nd AI system and previous probability (first posterior density probability) generated based on 1st AI confidence as a priori, a component 1710 configured to compute a third posterior density probability of a feature being in an image using confidence level indicated by a 3rd AI system and previous probability (second posterior density probability) generated based on 2nd AI confidence as a priori.

Assembly of components 1600 further includes a component 1800 configured to determine tags to include in a tag list associated with a scanned image. Component 1800 includes a component 1802 configured to receive and overall confidence level for a consensus feature and a tag associated with a scanned image, a component 1804 configured to determine if the overall confidence level is below a minimum threshold and to control operation as a function of the determination, a component 1813 configured to discard the tag/feature in response to a determination that the overall confidence level is below the minimum confidence threshold level, and a component 1806 configured to determine if the overall confidence level is over an upper confidence level threshold and to control operation as a function of the determination. Assembly of components 1800 further includes a component 1808 configured to present a tag to a user as a suggested tag for a scanned image and request confirmation that the tag should be used in response to a determination that the overall confidence level is not over the upper confidence level threshold but is greater than or equal to the minimum confidence threshold level, a component 1814 configured to designate the tag corresponding to a feature as being a confirmed tag in response to a determination that the overall confidence level is over the upper confidence level threshold, a component 1810 configured to receive user response to a tag suggestion, a component 1812 configured to determine if the user confirmed that the tag should be used as a tag for the scanned image and to control operation as a function of the determination, a component 18131 configured to discard the tag/feature in response to a determination that the user did not confirm that hat the tag should be used as tag for the scanned image, a component 18141 configured to designate the tag and corresponding feature as being confirmed in response to a determination that the user confirmed that the tag should be used as a tag for the scanned image.

Component 1800 further includes a component 1816 configured to identify synonym(s) to a confirmed tag, and a component 1818 configured to add a confirmed tag and identified synonym(s) if any to a confirmed tag list corresponding to the scanned image.

Various features relate to a Method for determining the date of a scanned photo from face data. The method can be implemented by a user device, customer premise device or a network device such as sever 402. Thus the image dating method is implemented in some embodiments by customer/home management appliance 300 shown in FIG. 3 or any of the other figures, the server 402 shown in FIG. 4 or any of the other figures or another device. In each of the cases the device implementing the method includes a processor and non-volatile memory. The processor controls the device to perform the steps of the method and thereby determine an image capture date of a scanned photo, e.g., in an automated manner.

Some embodiments include one, more or all of the following features:

1. One or more neural networks that are available are used to estimate the age of a face. That is, given a photograph of a face a neural network or other processing device is used to make an estimation of the age of that face.
2. In some embodiments, digital photograph data is tagged with geographical and other data such as the date the photograph was taken. This is a hard date, generated by the device that took the photo. This reliable image capture date is associated in some embodiments with the determined age of objects, e.g., faces in the captured images.
3. When a photograph is scanned into or provided to an image processing device metadata is normally not available. Indeed, the individual doing the scanning may not have an idea of the date that the image was photographed.
4. In a situation where there are known dates of scanned images, but predicted ages of one or more objects in the individual images are determined, e.g., using a neural network. The date of the of the scanned image is then determined based on the known capture dates of other images including the same face and the estimated ages of those faces. This allows the capture date of an image to be determined, e.g., estimated, without the need for image metadata. The image capture date is determined in some embodiments using a Bayesian inference.
5. Where multiple images with hard dates and faces are available, the estimate of an image capture date of an image with an unknown capture date can be determined from multiple different images with known capture dates.
6. The following method may be used to estimate the age and thus capture date, of a scanned photograph:
   a. For each photograph with a known date, estimate the ages of faces using a neural network or other age estimation system. This will return a probability density.
   b. The age with the highest probability for face A is then taken.
   c. The method then associates the age with the date the photograph was taken. For example, if the age of the face is 40, and the date the photograph was taken is Jan. 1, 1990, we know that whenever we see this face in the future, we can offset the date 40 (and the date 1 January) with the difference in the estimated ages. E.g. if the neural network estimates the age of the same face in a new photo as 41, we know the taken date should be around Jan. 1, 1991.
7. The estimate of the date of a photograph can be based on multiple age estimations and dates taken combined with Bayesian inference:
   a. For each photo with a hard date, estimate the age of the face.
   b. The probability of the age of the face returned by the neural network is combined with previous estimates using the posterior density mode of Bayes and an image capture date determined.

One exemplary procedure can be summarized as follows:
1. For each photo in the system that has a known good date (so it was taken on a digital camera and uploaded), use a neural network to predict the probable age of each face in the photo.
2. In the resulting probability distribution choose the age for each face with the highest probability of correctness.
3. Associate the age with the number of days since the photo was taken.
4. Do this until every face with a known good date estimated.
5. For the set of known good dates and age predictions for each face, perform a standard linear regression. Compute the $r^2$ value of the regression.
6. If the $r^2$ value is above some level of sensitivity, (e.g., 90%) this is a regression that can be used to predict the age of a photograph from face data.
7. For every new photo that is SCANNED predict the age of the faces in the photograph.
8. If we have a valid regression for that face (e.g., $r^2$ greater than threshold) use that regression to predict the number of days since the photo was taken.
9. If there are multiple valid regressions, choose the one with highest $r^2$ number*number of observations.
10. Every time we have new known good dates, add more regressions to the database. Incidentally, a known good date can come from the USER specifically nominating a date for a photograph, it does not necessarily have to be from an upload.

The above exemplary method can be extended to use multiple regression and evaluate the coefficients that result instead of point 9.

Figure 17:
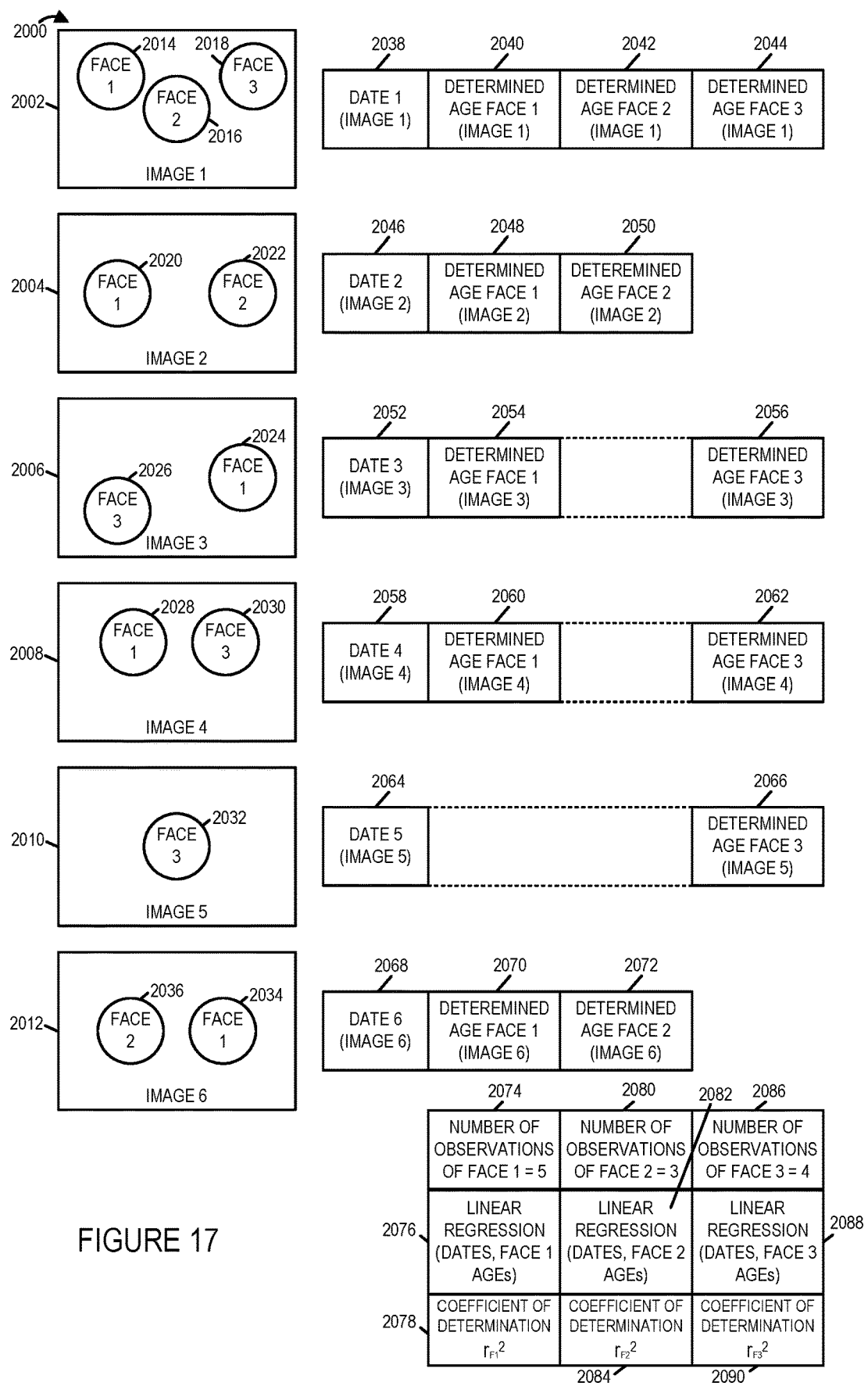
FIG. 17 is a drawing of an example of processing captured images with known image capture dates and generating a set of statistical information which can be used to estimate image capture dates of other images without known corresponding image capture dates.
Figure 18:
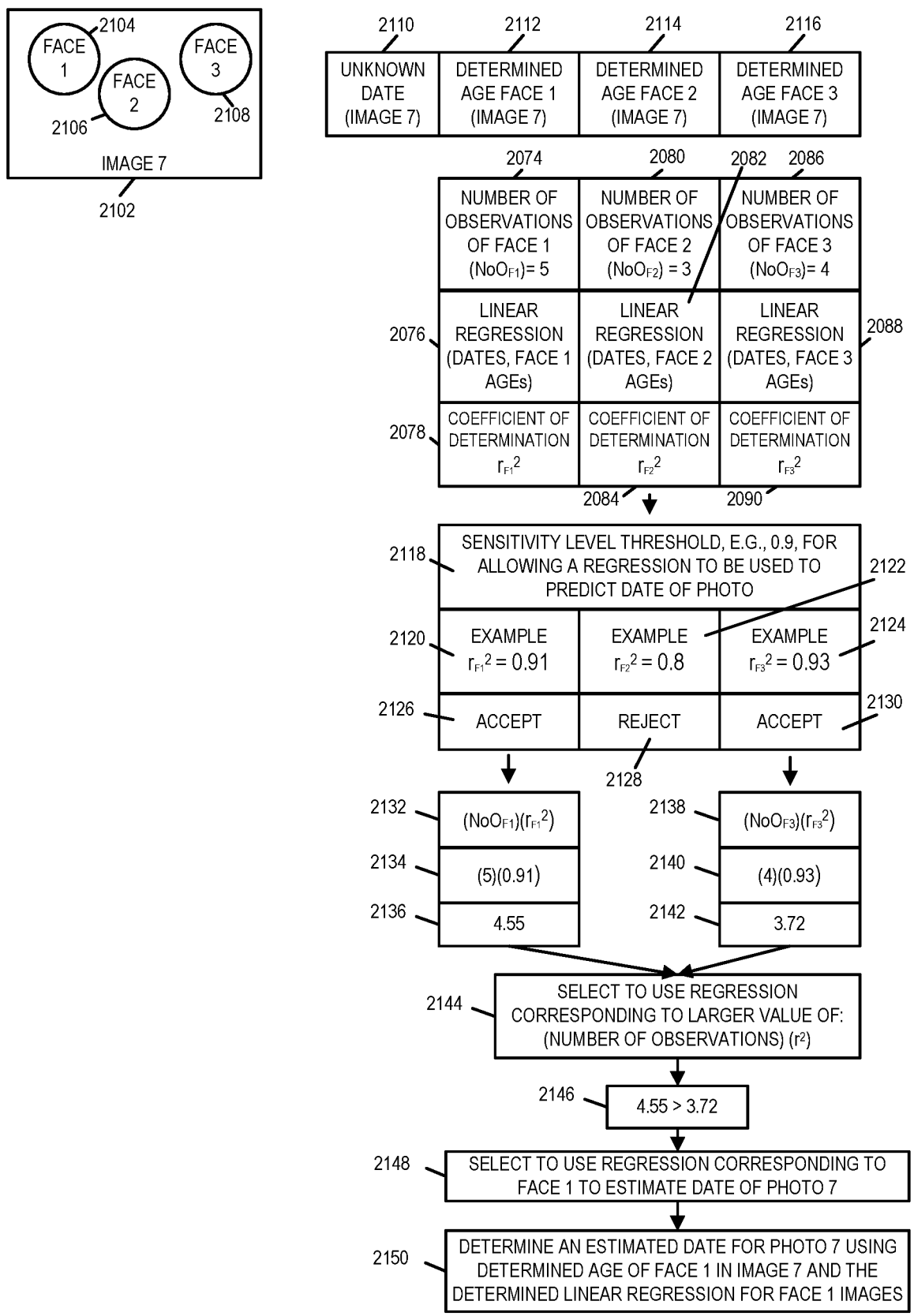
FIG. 18 is drawing illustrating an example in which an estimated image capture date is determined for exemplary image using the statistical information from FIG. 17, in accordance with an exemplary embodiment.

The exemplary method used in some embodiments and implemented by the can be understood with regard to the example shown in FIG. 17 and FIG. 18.

FIG. 17 is a drawing 2000 of an example of processing captured images with known image capture dates, and generating a set of statistical information which can be used to estimate image capture dates of other images without known corresponding image capture dates. Drawing 2000 includes exemplary captured images (image 1 2002, image 2 2004, image 3 2006, image 4 2008, image 5 2010, image 6 2012) with known image capture dates (date 1 2038, date 2 2046, date 3 2052, date 4 2058, date 5 2064, date 6 2068), respectively. In some embodiments, one or more of the known image capture dates (2038, 2046, 2052, 2058, 2064, 2068) are included as part of the metadata with the captured images (2002, 2004, 2006, 2008, 2010, 2012), respectively. In some embodiments, one or more of the known image capture dates (2038, 2046, 2052, 2058, 2064, 2068) are received, e.g., uploaded, with the captured images (2002, 2004, 2006, 2008, 2010, 2012), respectively. In some embodiments, one or more of the known image capture dates (2038, 2046, 2052, 2058, 2064, 2068) are obtained from user input, e.g., a user nominated date corresponding to an image is received.

Each of the captured images (image 1 2002, image 2 2004, image 3 2006, image 4 2008, image 5 2010, image 6 2012) includes one or more images of a face of a person. Image 1 2002 includes: i) face 1 2014, which is an image of the face of exemplary person 1, ii) face 2 2016, which is an image of the face of exemplary person 2, and iii) face 3 2018, which is an image of the face of exemplary person 3. Image 2 2004 includes: i) face 1 2020, which is an image of the face of exemplary person 1, and ii) face 2 2022, which is an image of the face of exemplary person 2. Image 3 2006 includes: i) face 1 2024, which is an image of the face of exemplary person 1, and ii) face 3 2026, which is an image of the face of exemplary person 3. Image 4 2008 includes: i) face 1 2028, which is an image of the face of exemplary person 1, and ii) face 3 2030, which is an image of the face of exemplary person 3. Image 5 2010 includes face 3 2032, which is an image of the face of exemplary person 3. Image 6 2012 includes: i) face 1 2034, which is an image of the face of exemplary person 1, and ii) face 2 2036, which is an image of the face of exemplary person 2.

Each captured image (image 1 2002, image 2 2004, image 3 2006, image 4 2008, image 5 2010, image 6 2012) is processed to determine ages for each of the faces in the captured image. A determined age of a face in a captured image may be, and sometimes is, estimated, e.g. predicted by a neural network or age determination application, which processes the image. In some embodiments, a determined age of a face may be a known age, e.g. a user knows the age of the face in the image and enters the known age.

The processing of image 1 2002 generates: i) determined age 2040 of face 1 2014, ii) determined age 2042 of face 2 2016, and iii) determined age 2044 of face 3 2018. The processing of image 2 2004 generates: i) determined age 2048 of face 1 2020, and ii) determined age 2050 of face 2 2022. The processing of image 3 2006 generates: i) determined age 2054 of face 1 2024, and ii) determined age 2056 of face 3 2026. The processing of image 4 2008 generates: i) determined age 2060 of face 1 2028, and ii) determined age 2062 of face 3 2030. The processing of image 5 2010 generates a determined age 2066 of face 3 2032. The processing of image 6 2012 generates: i) determined age 2070 of face 1 2034, and ii) determined age 2072 of face 2 2036. In various embodiments, the image dates and determined face ages are stored in a database.

The collected data corresponding to each face is processed to obtain a set of statistical information corresponding to that particular face. In this example, the number of observations of face 1 in the set of 6 processed images is equal to 5, as indicated by block 2074. A linear regression is performed, using the known image dates (2038, 2046, 2052, 2058, 2068) and corresponding determined face 1 ages (2040, 2048, 2054, 2060, 2070), respectively, as input, to obtain linear regression results 2076, which represents a relationship between image capture dates and determined ages for face 1. In addition a corresponding coefficient of determination rF12 2078 is determined. In various embodiments, the results (2074, 2076, 2078) are stored in a database.

In this example, the number of observations of face 2 in the set of 6 processed images is equal to 3, as indicated by block 2080. A linear regression is performed, using the known image dates (2038, 2046, 2068) and corresponding determined face 2 ages (2042, 2050, 2072), respectively, as input, to obtain linear regression results 2082, which represents a relationship between image capture dates and determined ages for face 2. In addition, a corresponding coefficient of determination rF22 2084 is determined. In various embodiments, the results (2080, 2082, 2084) are stored in a database.

In this example, the number of observations of face 3 in the set of 6 processed images is equal to 4, as indicated by block 2086. A linear regression is performed, using the known image dates (2038, 2052, 2058, 2064) and corresponding determined face 3 ages (2044, 2056, 2062, 2066), respectively, as input, to obtain linear regression results 2088, which represents a relationship between image capture dates and determined ages for face 3. In addition, a corresponding coefficient of determination rF32 2090 is determined. In various embodiments, the results (2086, 2088, 2090) are stored in a database.

FIG. 18 is drawing 2100 illustrating an example in which an estimated image capture date is determined for exemplary image 7 2102 using the statistical information from FIG. 17, in accordance with an exemplary embodiment. The image capture date for exemplary image 7 is unknown as indicated by block 2110. Image 7 2102 includes: i) face 1 2104, which is an image of the face of exemplary person 1, ii) face 2 2106, which is an image of the face of exemplary person 2, and iii) face 3 2108, which is an image of the face of exemplary person 3.

Image 7 2102 is processed to determine ages for each of the faces in the captured image. A determined age of a face in a captured image may be, and sometimes is, estimated, e.g., predicted by a neural network or age determination application, which processes the image. In some embodiments, a determined age of a face may be a known age, e.g., a user knows the age of the face in the image and enters the known age. The processing of image 7 2102 generates: i) determined age 2112 of face 1 2104, ii) determined age 2114 of face 2 2106, and iii) determined age 2116 of face 3 2108.

The set of stored statistical information (2074, 2076, 2078, 2080, 2082, 2084, 2086, 2088, 2090) from FIG. 17, the determined ages (2112, 2114, 2116) corresponding to faces (2104, 2106, 2108), respectively, of image 7 2102, and sensitivity level threshold 2118 are used to select a regression and use the selected regression to determine an estimated image capture date for image 7 2102.

The sensitivity level threshold 2118, e.g., a value of 0.9, is used to determine if a regression is allowed to be used to predict the date of a photo. In this example, consider that the coefficient of determination (the r2 value) corresponding to face 1 images, rF12, has been determined to be 0.91, as indicated in block 2120. The coefficient of determination rF12 is compared to the sensitivity level threshold and determined to be greater than the sensitivity level threshold (0.91 is greater than 0.9); therefore, it is deemed acceptable to use the regression corresponding to face 1 to determine the image capture date of image 7 2102, as indicated by accept in block 2126.

In this example, consider that the coefficient of determination corresponding to face 2 images, rF22, has been determined to be 0.80, as indicated in block 2122. The coefficient of determination rF22 is compared to the sensitivity level threshold and determined to be less than the sensitivity level threshold (0.80 is less than 0.9); therefore it is not acceptable to use the regression corresponding to face 2 to determine the image capture date of image 7 2102, as indicated by reject in block 2128.

In this example, consider that the coefficient of determination corresponding to face 3 images, rF32, has been determined to be 0.93, as indicated in block 2124. The coefficient of determination rF32 is compared to the sensitivity level threshold and determined to be greater than the sensitivity level threshold (0.93 is greater than 0.9); therefore it is deemed acceptable to use the regression corresponding to face 3 to determine the image capture date of image 7 2102, as indicated by accept in block 2130.

One of the acceptable regressions (the determined face 1 regression or determined face 3 regression) is now selected to be used to determine the estimated image capture date of image 7 2102. In this exemplary embodiment, the regression corresponding to the highest value from: (number of observations)*(coefficient of determination) is selected from among the candidate regression which have been accepted. Corresponding to face 1, Number of Observation of face 1 (NoOF1) is multiplied by coefficient of determination rF12, as indicated by block 2132, which is (5)(0.91), as indicated by block 2134, resulting in a value of 4.55, as indicated by block 2136. Corresponding to face 3, Number of Observation of face 3 (NoOF3) is multiplied by coefficient of determination rF32, as indicated by block 2138, which is (4)(0.93), as indicated by block 2140, resulting in a value of 3.72, as indicated by block 2142.

Figures 19, 19A, 19B, 19C:
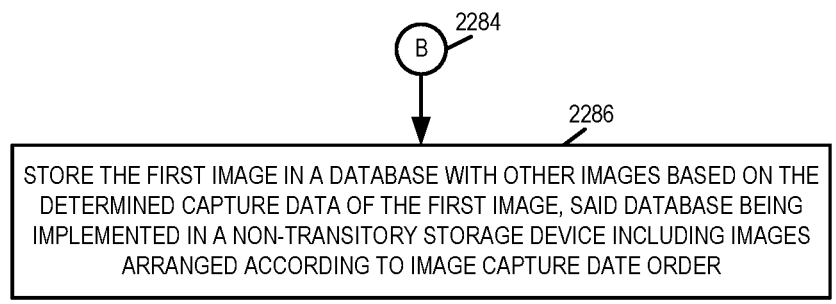
FIG. 19A is a first part of a flowchart of an exemplary image processing method in accordance with an exemplary embodiment.
FIG. 19B is a second part of a flowchart of an exemplary image processing method in accordance with an exemplary embodiment.
FIG. 19C is a third part of a flowchart of an exemplary image processing method in accordance with an exemplary embodiment.
FIG. 19 comprises the combination of FIG. 19A, FIG. 19B and FIG. 19C.
Figure 19A:
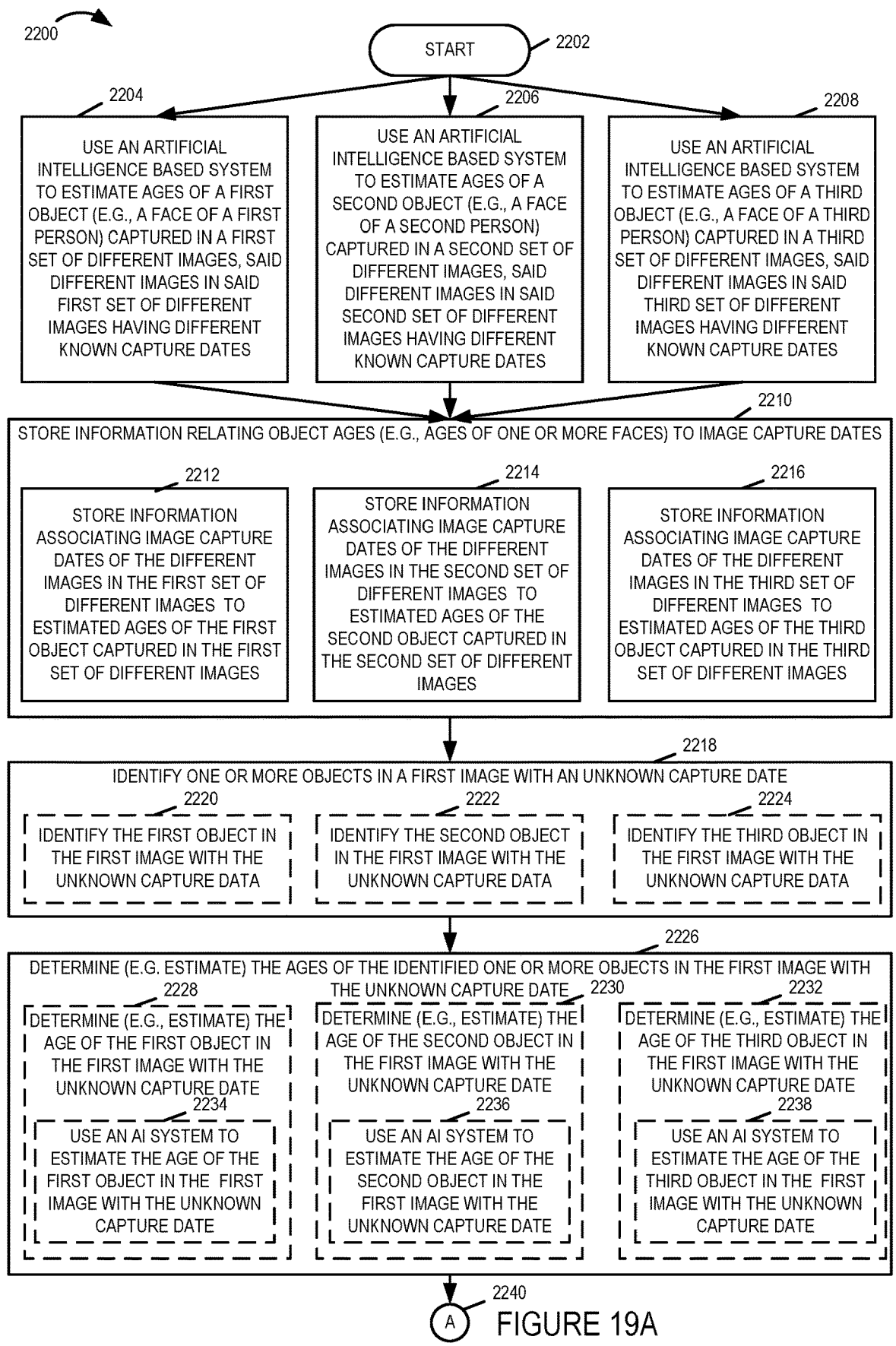
Figure 19B:
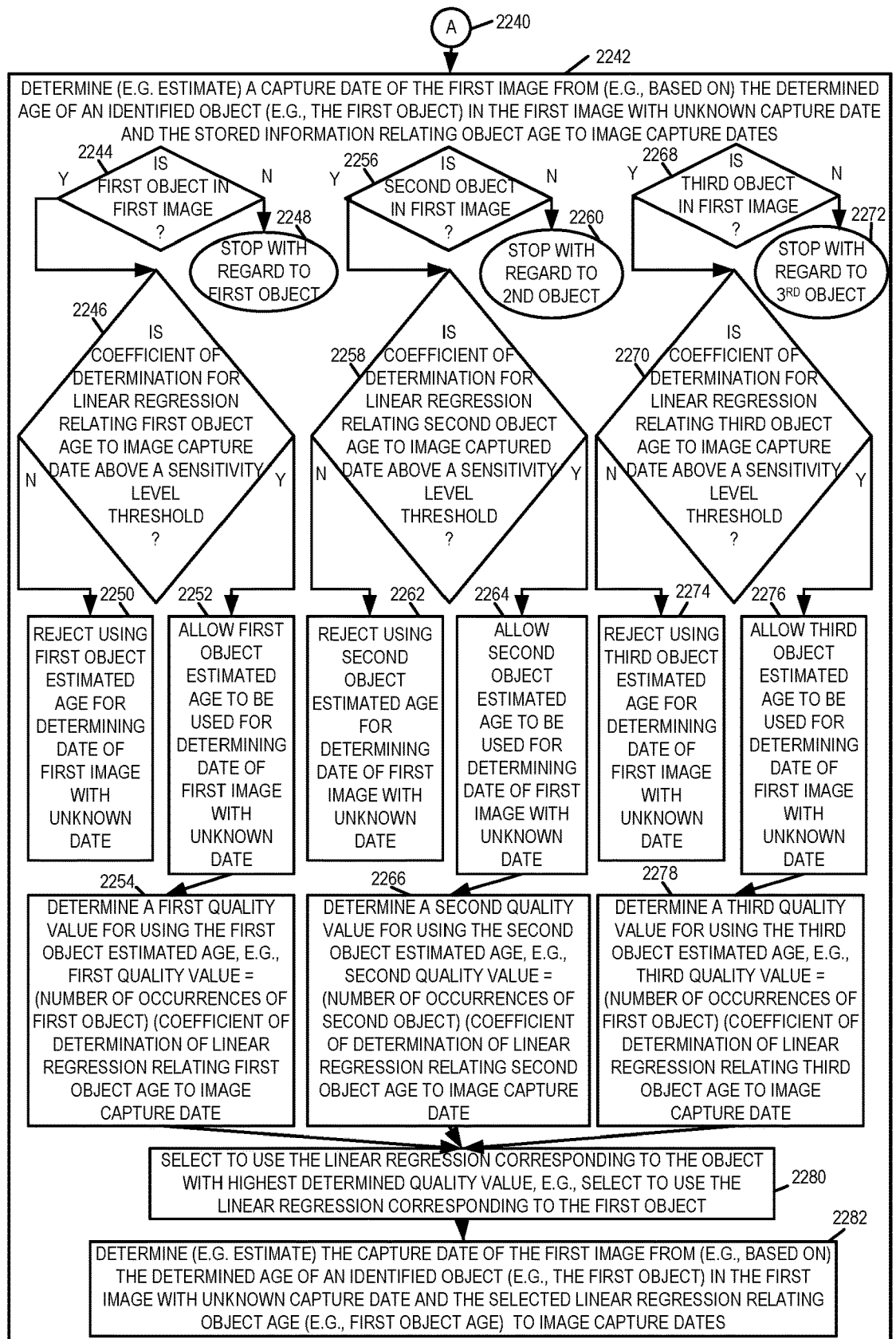

A selection is made to select to use the regression corresponding to the larger value of: (number of observations)*(r2), as indicated by block 2144. In this example 4.55 is greater than 3.72, as indicated by block 2146. Therefore in step 2148 the selection process selects to use the regression corresponding to face 1 to estimate the image capture date of photo 7 2102. In step 2150 an estimated capture date for photo 7 2102 is determined using i) the determined age 2112 of face 1 2104 in image 7 2102 and ii) the determined linear regression 2076 for face 1 images, e.g., the determined regression line mapping face 1 determined ages to known image capture dates is used to find the corresponding image capture date for image 7 2102 which corresponding to the determined age of face 1 2112 of image 7 2102. FIG. 19, comprising the combination of FIG. 19A, FIG. 19B and FIG. 19C, is a flowchart 2200 of an exemplary image processing method in accordance with an exemplary embodiment.

Operation of the exemplary method starts in step 2202 and proceeds to steps 2204, 2206 and 2208. In step 2204 an artificial intelligence (AI) based system is used to estimate ages of a first object (e.g., a face of a first person) captured in a first set of different images, said different images in said first set of different image having different known capture dates. In step 2206 an artificial intelligence (AI) based system is used to estimate ages of a second object (e.g., a face of a first second) captured in a second set of different images, said different images in said second set of different image having different known capture dates. In step 2208 an artificial intelligence (AI) based system is used to estimate ages of a third object (e.g., a face of a third person) captured in a third set of different images, said different images in said third set of different image having different known capture dates. Operation proceeds from steps 2204, 2206 and 2208 to step 2210.

In step 2210 information is stored relating object images (e.g., ages of one or more faces) to image capture dates. Step 2210 includes steps 2212, 2214 and 2216. In step 2212 information is stored associating image capture dates of the different images in the first set of images to estimated ages of the first object captured in the first set of different images. In step 2214 information is stored associating image capture dates of the different images in the second set of images to estimated ages of the second object captured in the second set of different images. In step 2216 information is stored associating image capture dates of the different images in the third set of images to estimated ages of the third object captured in the third set of different images. Operation proceeds from step 2210 to step 2218.

In step 2218 one or more objects in a first image with an unknown capture date are identified. Step 2218 includes one or more or all of steps 2220, 2222 and 2224. In step 2220 the first object is identified in the first image with the unknown capture date. In step 2222 the second object is identified in the first image with the unknown capture date. In step 2224 the third object is identified in the first image with the unknown capture date. Operation proceeds from step 2218 to step 2226.

In step 2226 the ages of the identified one or more objects in the first image with the unknown capture date are determined, e.g., estimated. Step 2226 includes one or more or all of steps 2228, 2230 and 2232. In step 2228 the age of the first object in the first image with the unknown captured data is determined, e.g., estimated. In some embodiments, step 2228 includes step 2234, in which an AI system is used to estimate the age of the first object in the first image with the unknown capture data. In step 2230 the age of the second object in the first image with the unknown captured data is determined, e.g., estimated. In some embodiments, step 2230 includes step 2236, in which an AI system is used to estimate the age of the second object in the first image with the unknown capture data. In step 2232 the age of the third object in the first image with the unknown captured data is determined, e.g., estimated. In some embodiments, step 2232 includes step 2238, in which an AI system is used to estimate the age of the third object in the first image with the unknown capture data. Operation proceeds from step 2226, via connecting node A 2240, to step 2242.

In step 2241, a capture date of the first image, with unknown capture date, is determined, e.g., estimated, from the determined age of an identified object, (e.g., the first object, the second object or the third object), in the first image with unknown capture data and stored information relating object age to image capture dates. Step 1142 includes steps 2244, 2246, 2248, 2250, 2252, 2254, 2256, 2258, 2260, 2262, 2264, 2266, 2268, 2270, 2272, 2274, 2276, 2278, 2280 and 2282. In step 2244, a check is performed as to whether or not the first object is in the first image. If the check determines that the first object is not in the first image, then operation proceeds from step 2244 to step 2248 in which operation is stopped with regard to the performing additional steps to use the first object to determine a capture date of the first image. However, if the check determines that the first object is in the first image, then operation proceeds from step 2244 to step 2246. In step 2246 the coefficient of determination for the liner regression relating first object age to image capture date is compared to a sensitivity level threshold to determine if the coefficient of determination for the liner regression relating first object age to image capture date is above the sensitivity level threshold. If the determination is that the coefficient of determination for the liner regression relating first object age to image capture date is not above the sensitivity level threshold, then operation proceeds from step 2246 to step 2250, in which the possibility of using the first object estimated age for determining the date of the first image with unknown captured date is rejected. However, if the determination is that the coefficient of determination for the liner regression relating first object age to image capture date is above the sensitivity level threshold, then operation proceeds from step 2246 to step 2252, in which the first object estimated age is allowed to be used for determining the date of the first image with unknown capture date. Operation proceeds from step 2252 to step 2254, in which a first quality value for using the first object estimated age to determine a capture date of the first image with unknown capture data is determined. For example, the first quality value=(number of occurrences of the first object, e.g. number of images in the first set of different images) (coefficient of determination of linear regression relating first object age to image capture date).

In step 2256, a check is performed as to whether or not the second object is in the first image. If the check determines that the second object is not in the first image, then operation proceeds from step 2256 to step 2260 in which operation is stopped with regard to the performing additional steps to use the second object to determine a capture date of the first image. However, if the check determines that the second object is in the first image, then operation proceeds from step 2256 to step 2258. In step 2258 the coefficient of determination for the liner regression relating second object age to image capture date is compared to a sensitivity level threshold to determine if the coefficient of determination for the liner regression relating second object age to image capture date is above the sensitivity level threshold. If the determination is that the coefficient of determination for the liner regression relating second object age to image capture date is not above the sensitivity level threshold, then operation proceeds from step 2258 to step 2262, in which the possibility of using the second object estimated age for determining the date of the first image with unknown captured date is rejected. However, if the determination is that the coefficient of determination for the liner regression relating second object age to image capture date is above the sensitivity level threshold, then operation proceeds from step 2258 to step 2264, in which the second object estimated age is allowed to be used for determining the date of the first image with unknown capture date. Operation proceeds from step 2254 to step 2266, in which a second quality value for using the second object estimated age to determine a capture date of the first image with unknown capture data is determined. For example, the second quality value=(number of occurrences of the second object, e.g., number of images in the second set of different images) (coefficient of determination of linear regression relating second object age to image capture date).

In step 2268, a check is performed as to whether or not the third object is in the first image. If the check determines that the third object is not in the first image, then operation proceeds from step 2268 to step 2272 in which operation is stopped with regard to the performing additional steps to use the third object to determine a capture date of the first image. However, if the check determines that the third object is in the first image, then operation proceeds from step 2268 to step 2270. In step 2270 the coefficient of determination for the liner regression relating third object age to image capture date is compared to a sensitivity level threshold to determine if the coefficient of determination for the liner regression relating third object age to image capture date is above the sensitivity level threshold. If the determination is that the coefficient of determination for the liner regression relating third object age to image capture date is not above the sensitivity level threshold, then operation proceeds from step 2270 to step 2274, in which the possibility of using the third object estimated age for determining the date of the first image with unknown captured date is rejected. However, if the determination is that the coefficient of determination for the liner regression relating third object age to image capture date is above the sensitivity level threshold, then operation proceeds from step 2270 to step 2276, in which the third object estimated age is allowed to be used for determining the date of the first image with unknown capture date. Operation proceeds from step 2276 to step 2278, in which a third quality value for using the third object estimated age to determine a capture date of the first image with unknown capture data is determined. For example, the third quality value=(number of occurrences of the third object, e.g. number of images in the third set of different images) (coefficient of determination of linear regression relating third object age to image capture date).

Operation proceeds from one or more or all of steps 2254, 2266 and 2278, to step 2280. In step 2280 the linear regression, corresponding to the object with the highest determined quality value is selected to be used to determine the capture date of the first image. For example, the first quality value is the largest value among the values under consideration, and the linear regression corresponding to first object is selected to be used. Operation proceeds from step 2280 to step 2282.

In step 2282 the capture date of the first image is determined, e.g. estimated, from the determined age of an identified object (e.g., the first object) in the first image with unknown capture data and the selected linear regression relating object age (e.g., first object age) to image capture dates. Operation proceeds from step 2242, via connecting node B 2284, to step 2286.

In step 2286 the first image is stored in a database with other images based on the determined capture date of the first image, said database being implemented in a non-transitory storage device including images arranged according to image capture date order.

In some embodiments, the first object is a face of a person or a building. In some embodiments, second object is a face of a person or a building. In some embodiments, the third object is a face of a person or a building.

In some embodiments, image capture dates are expressed as calendar dates or a number of days from a reference date (e.g., number of days from a fixed calendar date which can make it easier to relate and plot image/date information in a computer system than if calendar dates are used in computing/expressing the date information in some cases).

The exemplary method of flowchart 2200 of FIG. 19 will now be related to the example of FIGS. 17 and 18. Object 1 is face 1, object 2 is face 2, and object 3 is face 3. The first set of different images={image 1 2002, image 2 2004, image 3 2006, image 4 2008, image 6 2012}. The second set of different images={image 1 2002, image 2 2004, image 6 2012}. The third set of different images={image 1 2002, image 3 2006, image 4 2008}. The stored information associating image capture dates of the different images in the first set of different images to estimated ages of the first object captured in the first set of different images includes: number of observation of face 1 2074, which equals 5, linear regression 2074 (relating image dates to face 1 ages), and coefficient of determination r F12 2078. The stored information associating image capture dates of the different images in the second set of different images to estimated ages of the second object captured in the second set of different images includes: number of observation of face 2 2080, which equals 3, linear regression 2082 (relating image dates to face 2 ages), and coefficient of determination r F22 2084. The stored information associating image capture dates of the different images in the third set of different images to estimated ages of the third object captured in the third set of different images includes: number of observation of face 3 2086, which equals 4, linear regression 2088 (relating image dates to face 3 ages), and coefficient of determination r F32 2090.

The first image with unknown capture date is image 7 2102. The sensitivity level threshold is 0.9. The regressions corresponding to face 1 and face 3 are allowed to be used, while the regression corresponding to face 2 is rejected, based on coefficient of determination value (0.91, 0.8. 0.93) comparisons to the sensitivity level threshold (0.9). The linear regression 2076 corresponding to face 1 is selected, and used to determine, e.g., estimate, the date of the first image with unknown capture date (image 7 2102), since the calculated first quality value (4.55) is greater than the calculated third quality value (3.72).

Figures 20, 20A, 20B, 20C:
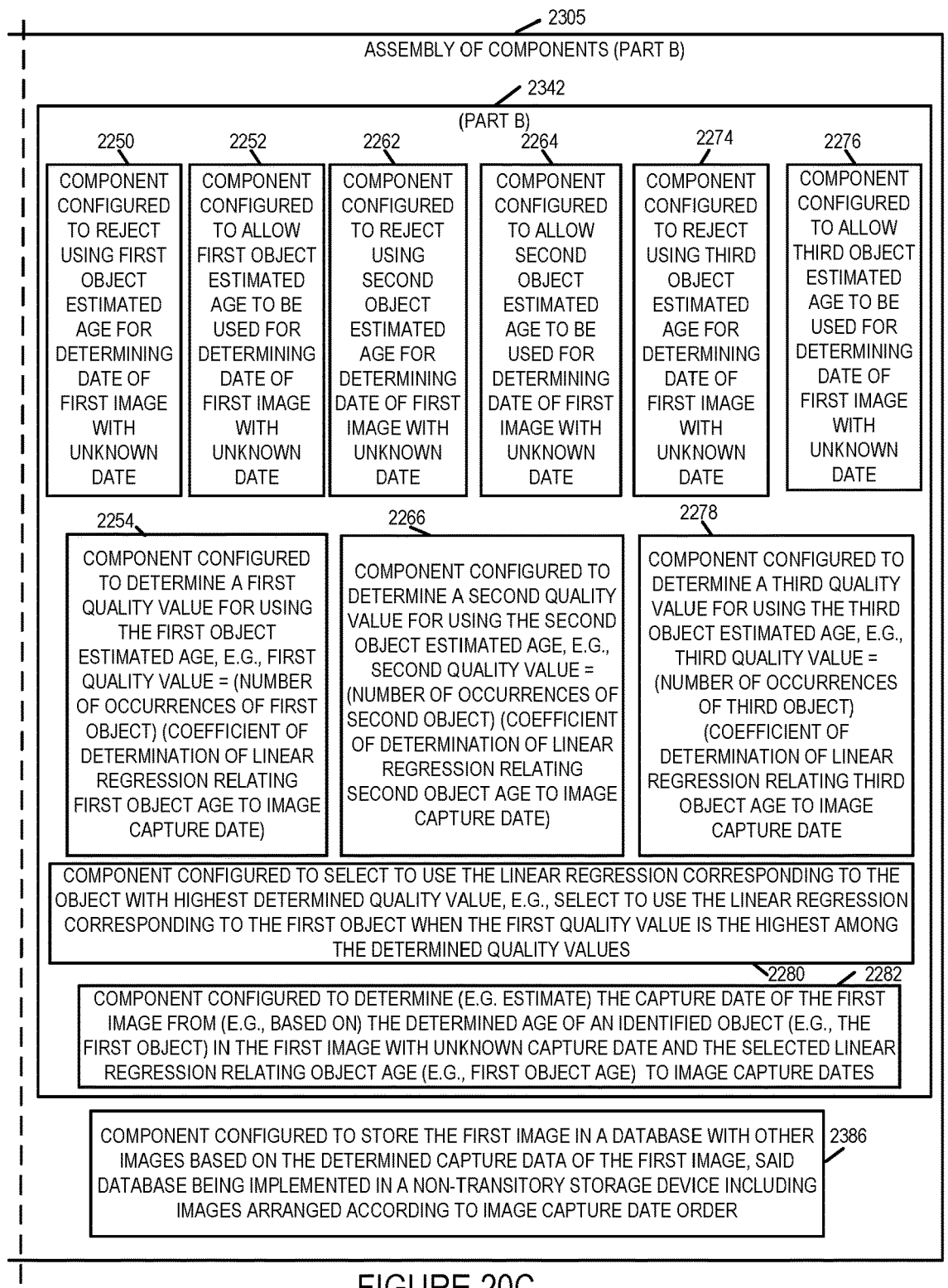
FIG. 20A is a drawing of a first part of an exemplary assembly of components in accordance with an exemplary embodiment.
FIG. 20B is a drawing of a second part of an exemplary assembly of components in accordance with an exemplary embodiment.
FIG. 20C is a drawing of a third part of an exemplary assembly of components in accordance with an exemplary embodiment.
FIG. 20 comprises the combination of FIG. 20A, FIG. 20B and FIG. 20C.
Figure 20A:
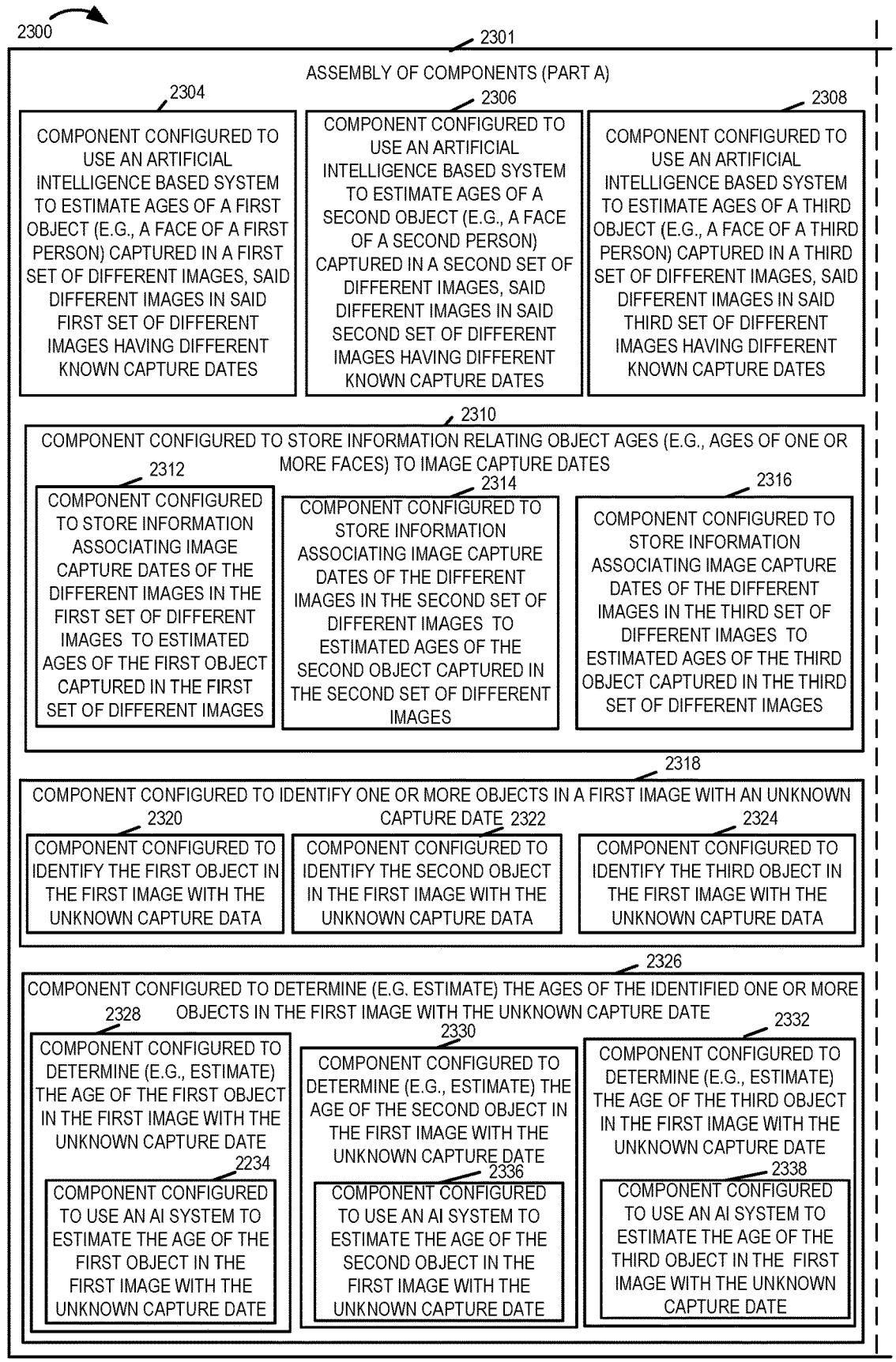
Figure 20B:
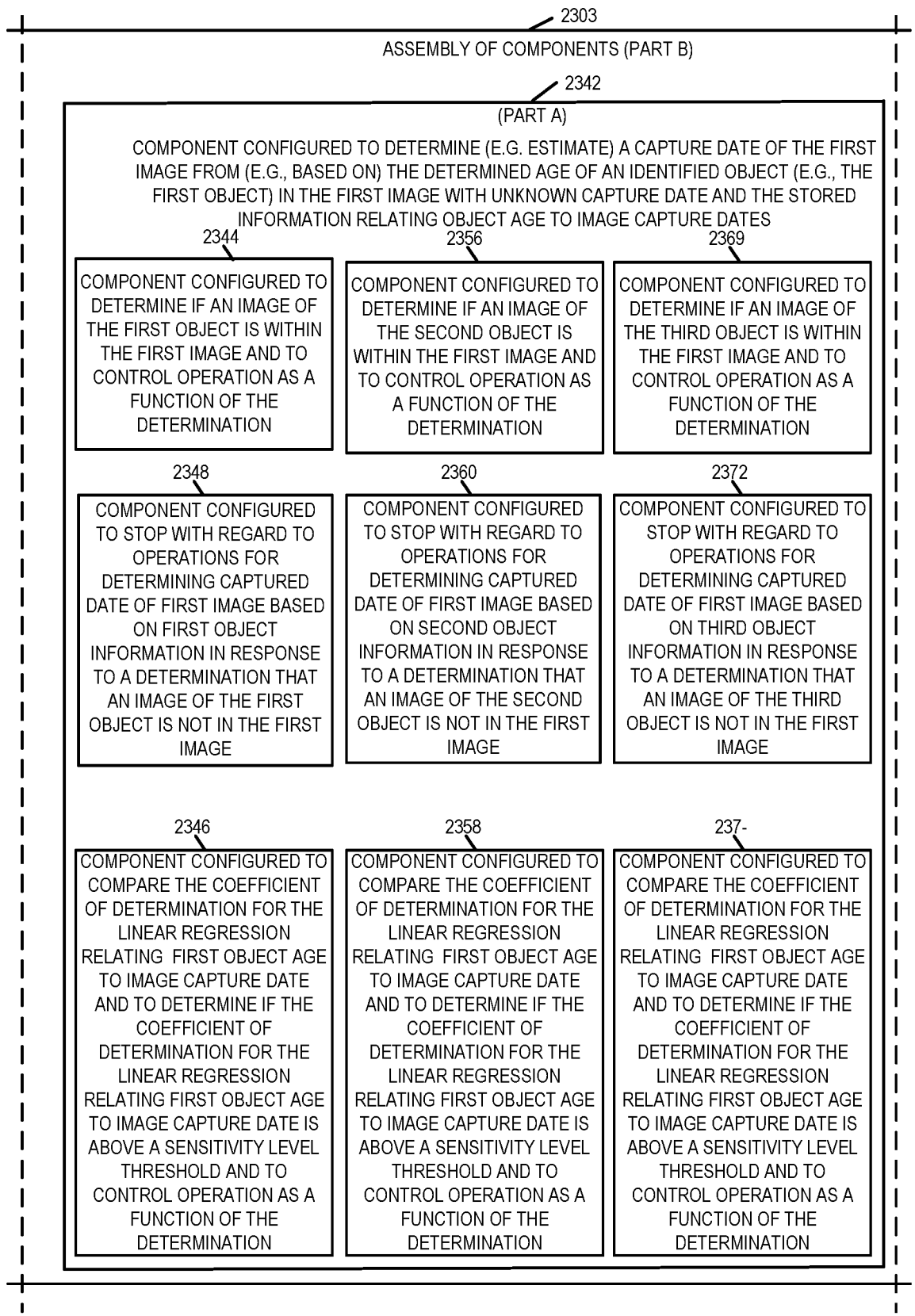

FIG. 20, comprising the combination of FIG. 20A, FIG. 20B and FIG. 20C, is a drawing of an exemplary assembly of components 2300, comprising the combination of Part A 2301, Part B 2303 and Part C 2305, in accordance with an exemplary embodiment.

Assembly of components 2300 includes a component 2304 configured to use an artificial intelligence (AI) based system to estimate ages of a first object, e.g., a face of a first person, captured in a first set of different images, said different images in said first set of different images having different known capture dates, a component 2306 configured to use an artificial intelligence (AI) based system to estimate ages of a second object, e.g., a face of a second person, captured in a second set of different images, said different images in said second set of different images having different known capture dates, and a component 2308 configured to use an artificial intelligence (AI) based system to estimate ages of a third object, e.g., a face of a third person, captured in a third set of different images, said different images in said third set of different images having different known capture dates. Assembly of components 2300 further includes a component 2310 configured to store information relating object ages, e.g., ages of one or more faces, to image capture dates. Component 2310 includes a component 2312 configured to store information associating image capture dates of the different images in the first set of different images to estimated ages of the first object captured in the first set of different images, a component 2314 configured to store information associating image capture dates of the different images in the second set of different images to estimated ages of the second object captured in the second set of different images, and a component 2316 configured to store information associating image capture dates of the different images in the third set of different images to estimated ages of the third object captured in the third set of different images.

Assembly of components 2300 further includes a component 2318 configured to identify one or more objects in a first image with an unknown capture date. Component 2318 includes a component 2320 configured to identify the first object in the first image with the unknown capture date, a component 2322 configured to identify the second object in the first image with the unknown capture date, and a component 2324 configured to identify the third object in the first image with the unknown capture date.

Assembly of components 2300 further includes a component 2326 configured to determine, e.g., estimate, the ages of the identified one or more objects in the first image with the unknown capture date. Component 2326 includes a component 2328 configured to determine, e.g., estimate, the age of the first object in the first image with the unknown capture date, a component 2330 configured to determine, e.g. estimate, the age of the second object in the first image with the unknown capture date, and component 2332 configured to determine, e.g. estimate, the age of the third object in the first image with the unknown capture date. Component 2328 includes a component 2334 configured to use an AI system to estimate the age of the first object in the first image with the unknown capture date. Component 2330 includes a component 2336 configured to use an AI system to estimate the age of the second object in the first image with the unknown capture date. Component 2332 includes a component 2338 configured to use an AI system to estimate the age of the third object in the first image with the unknown capture date.

Assembly of components 2300 further includes a component 2342 configured to determine, e.g., estimate, a capture data of the first image from the determined age of an identified object in the first image with the unknown capture date and the stored information relating object age to image capture dates. Component 2342 includes a component 2344 configured to determined if an image of the first object is within the first image and to control operation as a function of the determination, a component 2348 configured to stop with regard to operations for determining captured date of the first image based on the first object information in response to a determination that an image of the first object is not in the first image and a component 2346 configured to compare the coefficient of determination for the linear regression relating first object age to image captured dates and to determine if the coefficient of determination for the linear regression relating the first object age to image captured date is above a sensitivity level threshold and to control operation as a function of the determination. Component 2342 further includes a component 2356 configured to determined if an image of the second object is within the first image and to control operation as a function of the determination, a component 2360 configured to stop with regard to operations for determining captured date of the first image based on the second object information in response to a determination that an image of the second object is not in the first image and a component 2358 configured to compare the coefficient of determination for the linear regression relating second object age to image captured dates and to determine if the coefficient of determination for the linear regression relating the second object age to image captured date is above a sensitivity level threshold and to control operation as a function of the determination. Component 2342 further includes a component 2369 configured to determined if an image of the third object is within the first image and to control operation as a function of the determination, a component 2372 configured to stop with regard to operations for determining captured date of the first image based on the third object information in response to a determination that an image of the third object is not in the first image and a component 2374 configured to compare the coefficient of determination for the linear regression relating third object age to image captured dates and to determine if the coefficient of determination for the linear regression relating the third object age to image captured date is above a sensitivity level threshold and to control operation as a function of the determination.

Component 2342 further includes a component 2250 configured to reject using first object estimated age for determining the date of the first image with unknown date, a component 2352 configured to allow first object estimated age to be used for determining the data of the first image with unknown date, and a component 2254 configured to determine a first quality value for using the first object estimated age. In some exemplary embodiments, the first quality value=(number of occurrences of the first object, e.g. the number of images in the first set of different images) (coefficient of determination of linear regression relating first object age to image capture date). Component 2342 further includes a component 2362 configured to reject using second object estimated age for determining the date of the first image with unknown date, a component 2364 configured to allow second object estimated age to be used for determining the data of the first image with unknown date, and a component 2366 configured to determine a second quality value for using the second object estimated age. In some exemplary embodiments, the second quality value= (number of occurrences of the second object, e.g. the number of images in the second set of different images)(coefficient of determination of linear regression relating second object age to image capture date). Component 2342 further includes a component 2274 configured to reject using third object estimated age for determining the date of the first image with unknown date, a component 2276 configured to allow third object estimated age to be used for determining the date of the first image with unknown date, and a component 2278 configured to determine a third quality value for using the third object estimated age. In some exemplary embodiments, the third quality value=(number of occurrences of the third object, e.g. the number of images in the third set of different images)(coefficient of determination of linear regression relating third object age to image capture date).

Component 2342 further includes a component 2280 configured to select to use the linear regression corresponding to the object with the highest determined quality value, e.g. select to use the linear regression corresponding to the first object when the first quality value is the highest determined quality value among first, second and third quality values, and a component 2282 configured to determine, e.g. estimate, the capture date of the first object from the determined age of an identified object, e.g. the first object, in the first image with unknown capture date and the selected linear regression relating object age (e.g., first object age) to image capture dates.

Assembly of components 2300 further includes a component 2386 configured to store the first image in a database with other images based on the determined capture data of the first image, said database being implemented in a non-transitory storage device including images arranged according to image capture date order.

Numbered List of Exemplary Method Embodiments

Method Embodiment 1. An image processing method, the method comprising: storing (2210) information relating object ages (e.g., ages of one or more faces) to image capture dates; identifying (2220) a first object (e.g., a first face of a first person, a person, an animal or a plant (e.g., tree)) in a first image with an unknown image capture date; determining (e.g., estimating) (2228) the age of the first object (e.g., first face); and determining (2242) a capture date of the first image from (e.g., based on) the determined age of the first object and the stored information relating object age to image capture dates.

Method Embodiment 2. The method of Method Embodiment 1, further comprising: storing (2284) the first image in a database with other images based on the determined capture date of the first image, said database being implemented in a non-transitory storage device including images arranged according to image capture date order.

Method Embodiment 3. The method of Method Embodiment 1, wherein the first object is a face of a first person; and wherein determining (2228) the age of the first object includes using (2234) an artificial intelligence based system to estimate the age of the first person and thus the first face from a portion of the first image corresponding to the first face.

Method Embodiment 4. The method of Method Embodiment 3, further comprising: prior to determining (2242) a capture date of the first image: using (2204) the artificial intelligence based system to estimate ages for multiple different images of the face of the first person, said different images having different known image capture dates and storing (2212) information associating image capture dates and estimated ages for said multiple different images of the face of the first person in said database.

Method Embodiment 5. The method of Method Embodiment 1 wherein said first object is a face of a person or a building.

Method Embodiment 6. The method of Method Embodiment 5, wherein said image capture dates are expressed as calendar dates or a number of days from a reference date (e.g., number of days from a fixed calendar date which can make it easier to relate and plot image/date information in a computer system than if calendar dates are used in computing/expressing the date information in some cases).

Numbered List of Exemplary System Embodiments

System Embodiment 1. An image processing system, comprising: a non-transitory storage device (e.g., memory, disc drive, etc.) storing information relating object ages (e.g., ages of one or more faces) to image capture dates; and a processor configured to: identify a first object (e.g., a first face of a first person) in a first image with an unknown image capture date; determine (e.g., estimate) the age of the first object (e.g., first face); and determine a capture date of the first image from (e.g., based on) the determined age of the first object and the stored information relating object age to image capture dates.

System Embodiment 2. The system of System Embodiment 1, further comprising: an image database including the first image stored with other images, the first image and other images being arranged in said database based on the determined capture date of the first image and the capture date of the other images.

System Embodiment 3. The system of System Embodiment 1, wherein the images in said image database are stored on said non-transitory storage media or another non-transitory storage media according to image capture date order.

System Embodiment 4. The system of System Embodiment 1, wherein the first object is a face of a first person; and wherein determining the age of the first object includes using an artificial intelligence based system to estimate the age of the first person and thus the first face from a portion of the first image corresponding to the first face.

System Embodiment 5. The system of System Embodiment 4, wherein said processor is configured to, prior to determining a capture date of the first image, use the artificial intelligence based system to estimate ages for multiple different images of the face of the first person, said different images having different known image capture dates; and store information associating image capture dates and estimated ages for said multiple different images of the face of the first person in said database.

System Embodiment 6. The system of System Embodiment 1 wherein said first object is a face of a person or a building.

System Embodiment 7. The system of System Embodiment 6, wherein said image capture dates are expressed as calendar dates or a number of days from a reference date (e.g., number of days from a fixed calendar date which can make it easier to relate and plot image/date information in a computer system than if calendar dates are used in computing/expressing the date information in some cases).

Numbered List of Non-Transitory Computer Readable Medium Embodiments

Non-Transitory Compute Readable Medium Embodiment 1. A non-transitory computer readable medium including machine execute instruction, which when executed by a processor of a image processing device cause the image processing device to perform the steps of: storing (2210) information relating object ages (e.g., ages of one or more faces) to image capture dates; identifying (2220) a first object (e.g., a first face of a first person) in a first image with an unknown image capture date; determining (e.g., estimating) (2228) the age of the first object (e.g., first face); and determining (2242) a capture date of the first image from (e.g., based on) the determined age of the first object and the stored information relating object age to image capture dates.

The methods of various embodiments may be implemented using software, hardware and/or a combination of software and hardware. In some embodiments, modules are implemented as physical modules. In some such embodiments, the individual physical modules are implemented in hardware, e.g., as circuits, or include hardware, e.g., circuits, with some software. In other embodiments, the modules are implemented as software modules which are stored in memory and executed by a processor, e.g., general purpose computer. Various embodiments are also directed to machine, e.g., computer, readable medium, e.g., ROM, RAM, CDs, hard discs, etc., which include machine readable instructions for controlling a machine, e.g., processor or computer system, to implement one or more steps of a method.

It is understood that the specific order or hierarchy of steps in the processes disclosed is an example of exemplary approaches. Based upon design preferences, it is understood that the specific order or hierarchy of steps in the processes may be rearranged to some extent while remaining within the scope of the present disclosure.

In various embodiments nodes described herein are implemented using one or more modules to perform the steps corresponding to one or more methods. Thus, in some embodiments various features are implemented using modules. Such modules may be implemented using software, hardware or a combination of software and hardware. Many of the above described methods or method steps can be implemented using machine executable instructions, such as software, included in a non-transitory machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine, e.g., computer, readable medium including machine, e.g., computer, executable instructions for causing a machine, e.g., computer, processor and/or associated hardware, to perform one or more of the steps of the above-described method(s).

Some embodiments are directed to a computer program product comprising a computer-readable medium comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of the method or methods described herein. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope of the invention.

What is claimed is:

1. An image processing method, the method comprising:
    determining, for each of a plurality of images with known capture dates and a first object, corresponding first object age information, said first object age information including the age of the first object in a first image with a known first image capture date and the age of the first object in a second image with a known second image capture date;
    determining an age of the first object in a scanned image having an unknown image capture date, said scanned image including multiple objects of different ages, said multiple objects of different ages including the first object and a second object;
    determining a capture date of the scanned image from the determined age of the first object in the scanned image and said determined first object age information relating known image capture dates of images including said first object to different ages of said first object;
    storing the scanned image in a database in chronological image capture date order with captured digital images with known capture dates; and
    using the stored images and capture date information to support a date based image query.

2. The method of claim 1, further comprising:
    prior to determining the age of the first object in the scanned image, storing information relating object ages to image capture dates.

3. The method of claim 2,
    wherein the first object is a first face;
    wherein the scanned image includes multiple faces, said multiple faces including a second face and a third face in addition to said first face;
    wherein the method further comprising:
    determining an age of the second face in said scanned image; and determining an age of the third face in said scanned image.

4. The method of claim 3,
wherein determining the age of the first face in the image includes using a first number of observations of the first face in images with known image capture dates to determine the age of the first face in the scanned image;
wherein determining the age of the second face in the image includes using a second number of observations of the second face in images with known image capture dates to determine the age of the second face in the scanned image, said second number being different from the first number; and
wherein determining the age of the third face in the image includes using a third number of observations of the third face in images with known image capture dates to determine the age of the third face in the scanned image, said third number being different from the first number and also being different from the second number.

5. The method of claim 3,
wherein determining the age of the first object in the scanned image includes using an artificial intelligence based system to estimate the age of a first person to whom the first face corresponds from the scanned image; and
wherein determining the age of the second face in the scanned image includes using an artificial intelligence based system to estimate the age of a second person to whom the second face corresponds from the scanned image.

6. The method of claim 5, further comprising:
prior to determining a capture date of the scanned image:
using the artificial intelligence based system to estimate ages for multiple different images of the face of the first person, said different images having different known image capture dates; and
storing information associating image capture dates and estimated ages for said multiple different images of the face of the first person in said database.

7. The method of claim 2, wherein said first object is a building.

8. The method of claim 4, wherein determining the capture date of the scanned image includes:
selecting the determined age of one of the first, second and third faces to use in determining the capture date of the scanned image based on the number of observations used in determining the age of each of the individual ones of the first, second and third faces.

9. An image processing system, comprising:
a non-transitory storage device storing information relating object ages to image capture dates; and
a processor configured to:
determine, for each of a plurality of images with known capture dates and a first object, corresponding first object age information, said first object age information including the age of the first object in a first image with a known first image capture date and the age of the first object in a second image with a known second image capture date;
determine an age of the first object in a scanned image having an unknown image capture date, said scanned image including multiple objects of different ages, said multiple objects of different ages including the first object and a second object;
determine a capture date of the scanned image from the determined age of the first object in the scanned image and said determined first object age information relating known image capture dates of images including said first object to different ages of said first object;
store the scanned image in a database in chronological image capture date order with captured digital images with known capture dates; and
use the stored images and capture date information to support a date based image query.

10. The image processing system of claim 9, wherein the processor is further configured to:
identify the first object in the scanned image.

11. The image processing system of claim 9,
wherein the first object is a face of a first person;
wherein the scanned image includes multiple faces, said multiple faces including a second face and a third face in addition to said first face; and
wherein the processor is further configured to:
determine an age of the second face in said scanned image; and
determine an age of the third face in said scanned image.

12. The image processing system of claim 11, further comprising:
said database including the scanned image and other images with known capture dates, said images in said database being stored in chronological image capture date order.

13. The image processing system of claim 10,
wherein the first object is a first face;
wherein the scanned image includes multiple faces, said multiple faces including a second face and a third face in addition to said first face; and
wherein the processor is further configured to:
determine an age of the second face in said scanned image; and
determine an age of the third face in said scanned image.

14. The image processing system of claim 13,
wherein the first face is a face of a first person; and
wherein determining the age of the first object includes using an artificial intelligence based system to estimate the age of the first person and thus the first face from a portion of the scanned image corresponding to the first face.

15. The image processing system of claim 13,
wherein determining the age of the first face in the image includes using a first number of observations of the first face in images with known image capture dates to determine the age of the first face in the scanned image;
wherein determining the age of the second face in the image includes using a second number of observations of the second face in images with known image capture dates to determine the age of the second face in the scanned image, said second number being different from the first number; and
wherein determining the age of the third face in the image includes using a third number of observations of the third face in images with known image capture dates to determine the age of the third face in the scanned image, said third number being different from the first number and also being different from the second number.

16. The image processing system of claim 15,
wherein the processor is configured, as part of being configured to determine the capture date of the scanned image, to:
select the determined age of one of the first, second and third faces to use in determining the capture date of the scanned image based on the number of observations used in determining the age of each of the individual ones of the first, second and third faces.

17. The image processing system of claim 16, wherein scanned image capture date is expressed as a calendar date.

18. A non-transitory computer readable medium including machine executable instructions, which when executed by a processor of an image processing device cause the image processing device to perform the steps of:
  determining, for each of a plurality of images with known capture dates and a first object, corresponding first object age information, said first object age information including the age of the first object in a first image with a known first image capture date and the age of the first object in a second image with a known second image capture date;
  determining an age of the first object in a scanned image having an unknown image capture date, said scanned image including multiple objects of different ages, said multiple objects of different ages including the first object and a second object;
  determining a capture date of the scanned image from the determined age of the first object in the scanned image and said determined first object age information relating known image capture dates of images including said first object to different ages of said first object;
  storing the scanned image in a database in chronological image capture date order with captured digital images with known capture dates; and
  using the stored images and capture date information to support a date based image query.

19. The method of claim 8, wherein selecting the determined age of one of the first, second and third faces to use in determining the capture date of the scanned image includes selecting the determined age of the one of the first, second and third faces, which was determined from the largest number of observations, to use in determining the capture date of the scanned image.

20. The image processing system of claim 16, wherein the processor is configured to select the age of the one of the first, second, and third faces, which was determined from the largest number of observations, to use in determining the capture date of the scanned image.

* * * * *